United States Patent
Shih et al.

(10) Patent No.: US 12,117,595 B2
(45) Date of Patent: Oct. 15, 2024

(54) LENS ASSEMBLY

(71) Applicants: Sintai Optical (Shenzhen) Co., Ltd., ShenZhen (CN); Asia Optical Co., Inc., Taichung (TW)

(72) Inventors: Po-Yuan Shih, Taichung (TW); An-Kai Chang, Taichung (TW)

(73) Assignees: Sintai Optical (Shenzhen) Co., Ltd., ShenZhen (CN); Asia Optical Co., Inc., Taichung (TW)

( * ) Notice: Subject to any disclaimer, the term of this patent is extended or adjusted under 35 U.S.C. 154(b) by 499 days.

(21) Appl. No.: 17/485,755

(22) Filed: Sep. 27, 2021

(65) Prior Publication Data

US 2022/0146792 A1    May 12, 2022

(30) Foreign Application Priority Data

Nov. 6, 2020 (TW) ................................. 109138843
Dec. 29, 2020 (TW) ................................. 109146670
Apr. 22, 2021 (CN) ............................ 202110434009

(51) Int. Cl.
    *G02B 9/64*     (2006.01)
    *G02B 13/00*     (2006.01)
    *G02B 27/00*     (2006.01)

(52) U.S. Cl.
    CPC ........... *G02B 13/0045* (2013.01); *G02B 9/64* (2013.01); *G02B 27/0025* (2013.01)

(58) Field of Classification Search
    CPC .. G02B 13/0045; G02B 13/0015; G02B 9/64; G02B 27/0025
    USPC ......................................... 359/708, 713, 755
    See application file for complete search history.

(56) References Cited

U.S. PATENT DOCUMENTS

| | | | |
|---|---|---|---|
| 8,736,979 B2 | 5/2014 | Tsai et al. | |
| 11,391,922 B2* | 7/2022 | Chen | G02B 13/0045 |
| 11,614,600 B2 | 3/2023 | Kim | |
| 11,733,483 B2* | 8/2023 | Zhang | G02B 13/16 |
| | | | 359/755 |

(Continued)

FOREIGN PATENT DOCUMENTS

| | | |
|---|---|---|
| CN | 109445077 A | 3/2019 |
| CN | 109814229 A | 5/2019 |

(Continued)

*Primary Examiner* — William R Alexander
(74) *Attorney, Agent, or Firm* — McClure, Qualey & Rodack, LLP

(57) ABSTRACT

A lens assembly includes a first, a second, a third, a fourth, a fifth, a sixth, and a seventh lenses. The first lens has negative refractive power. The second, third, fifth, and sixth lenses have refractive power. The fourth lens has positive refractive power and includes a convex surface facing an image side. The sixth includes a concave surface facing an object side. The seventh lens has positive refractive power. The lens assembly satisfies at least one of the following conditions: $-4<f_2/f_6<7$; $0.7<f_3/f_7<1.1$; $-3<f_{123}/f_{4567}<2$; wherein $f_2$, $f_3$, $f_6$, and $f_7$ are respectively effective focal lengths of the second, third, sixth, and seventh lenses, $f_{123}$ is an effective focal length of a combination of the first, second, and third lenses, and $f_{4567}$ is an effective focal length of a combination of the fourth, fifth, sixth, and seventh lenses.

20 Claims, 28 Drawing Sheets

(56) References Cited

U.S. PATENT DOCUMENTS

| | | | |
|---|---|---|---|
| 2018/0059362 A1* | 3/2018 | Yeh | G02B 1/041 |
| 2020/0142158 A1* | 5/2020 | Yao | G02B 13/04 |
| 2020/0241248 A1* | 7/2020 | Chen | G02B 13/0045 |
| 2021/0003820 A1* | 1/2021 | Zhang | G02B 13/16 |
| 2021/0096328 A1 | 4/2021 | Wang et al. | |
| 2022/0082793 A1* | 3/2022 | Luan | G02B 13/0045 |
| 2023/0258908 A1* | 8/2023 | Yao | G02B 9/64 |
| | | | 359/713 |

FOREIGN PATENT DOCUMENTS

| | | | |
|---|---|---|---|
| CN | 110389428 A | 10/2019 | |
| CN | 110858028 A | 3/2020 | |
| CN | 111123479 A | 5/2020 | |
| CN | 111566536 A | 8/2020 | |
| CN | 112987231 A | 6/2021 | |
| CN | 113759497 A | 12/2021 | |
| EP | 3301495 A1 | 4/2018 | |
| JP | 2014102291 A | 6/2014 | |
| TW | 201819976 A | 6/2018 | |
| TW | 201925844 A | 7/2018 | |
| TW | 202028800 A | 8/2019 | |
| TW | I690743 A | 4/2020 | |
| TW | I690743 B | 4/2020 | |
| WO | 2020024599 A1 | 2/2020 | |

* cited by examiner

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have high resolution and resistance to environmental temperature change in accordance with different application requirements. However, the known lens assembly can't satisfy such requirements. Therefore, the lens assembly needs a new structure in order to meet the requirements of miniaturization, high resolution, and resistance to environmental temperature change at the same time.

BRIEF SUMMARY OF THE INVENTION

The invention provides a lens assembly to solve the above problems. The lens assembly of the invention is provided with characteristics of a shortened total lens length, an increased resolution, a resisted environmental temperature change, and still has a good optical performance.

The lens assembly in accordance with an exemplary embodiment of the invention includes a first lens, a second lens, a third lens, a fourth lens, a fifth lens, a sixth lens, and a seventh lens. The first lens is with negative refractive power. The second lens is with refractive power. The third lens is with refractive power. The fourth lens is with positive refractive power and includes a convex surface facing an image side. The fifth lens is with refractive power. The sixth lens is with refractive power and includes a concave surface facing an object side. The seventh lens is with positive refractive power. The first lens, the second lens, the third lens, the fourth lens, the fifth lens, the sixth lens, and the seventh lens are arranged in order from the object side to the image side along an optical the axis. An air gap is disposed between the sixth lens and the seventh lens. The lens assembly satisfies at least one of the following conditions: $-4<f_2/f_6<7$; $0.7<f_3/f_7<1.1$; $3<f_{123}/f_{4567}<2$; wherein $f_2$ is an effective focal length of the second lens, $f_3$ is an effective focal length of the third lens, $f_6$ is an effective focal length of the sixth lens, $f_7$ is an effective focal length of the seventh lens, $f_{123}$ is an effective focal length of a combination of the first lens, the second lens, and the third lens, and $f_{4567}$ is an effective focal length of a combination of the fourth lens, the fifth lens, the sixth lens, and the seventh lens.

In another exemplary embodiment, the second lens is with negative refractive power and the third lens is with positive refractive power.

In yet another exemplary embodiment, the third lens includes a convex surface facing the object side, the fourth lens further includes a concave surface facing the object side, the sixth lens further includes a convex surface facing the image side, and the seventh lens includes a concave surface facing the image side.

In another exemplary embodiment, the fifth lens is a biconcave lens with negative refractive power and includes a concave surface facing the object side and another concave surface facing the image side.

In yet another exemplary embodiment, the lens assembly satisfies at least one of the following conditions: $0.7<f/IH<1.5$; $-15<(R_{21}-R_{22})/(R_{21}+R_{22})<0.8$; $-6<R_{61}/R_{31}<30$; $-2<R_{42}/R_{51}<-0.8$; $0.2<Vd_5/Vd_6<3$; $3<TTL/BFL<5$; $0.5<Gap23/Gap67<0.75$; wherein f is an effective focal length of the lens assembly, IH is a half image height of the lens assembly, $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, BFL is an interval from an image side surface of the seventh lens to the image plane along the optical axis, Gap23 is an interval from an image side surface of the second lens to an object side surface of the third lens along the optical axis, and Gap67 is an interval from an image side surface of the sixth lens to an object side surface of the seventh lens along the optical axis.

In another exemplary embodiment, the fifth lens is with positive refractive power and the sixth lens is with negative refractive power.

In yet another exemplary embodiment, the third lens includes a convex surface facing the object side.

In another exemplary embodiment, the fifth lens is with negative refractive power and the sixth lens is with positive refractive power.

In yet another exemplary embodiment, the third lens includes a convex surface facing the object side, the fifth lens is a biconcave lens and includes a concave surface facing the object side and another concave surface facing the image side, and the sixth lens further includes a convex surface facing the image side.

In another exemplary embodiment, the fifth lens is with positive refractive power and the sixth lens is with positive refractive power.

In yet another exemplary embodiment, the second lens is with positive refractive power and the third lens is with negative refractive power.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
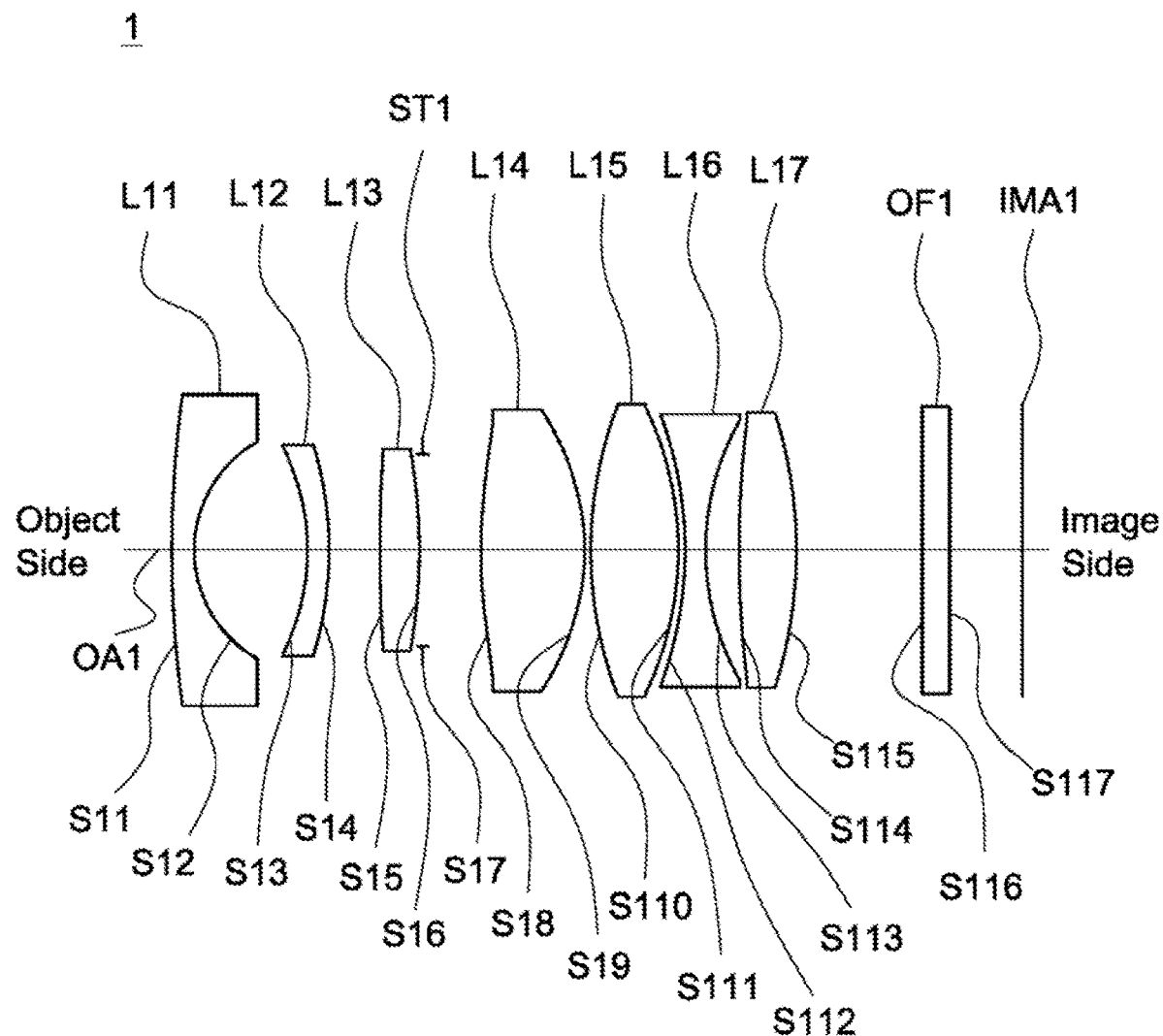
FIG. 1 is a lens layout diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, a sixth lens, and a seventh lens. The first lens is with refractive power. The second lens is with refractive power. The third lens is with refractive power. The fourth lens is with positive refractive power and includes a convex surface facing an image side. The fifth lens is with refractive power. The sixth lens is with refractive power and includes a concave surface facing an object side. The seventh lens is with positive refractive power. The first lens, the second lens, the third lens, the fourth lens, the fifth lens, the sixth lens, and the seventh lens are arranged in order from the object side to the image side along an optical axis. An air gap is disposed between the sixth lens and the seventh lens. The lens assembly satisfies: 0.7<f/IH<1.5; wherein f is an effective focal length of the lens assembly and IH is a half image height of the lens assembly.

Referring to Table 1, Table 3, Table 5, and Table 7, wherein Table 1, Table 3, Table 5, and Table 7 show optical specification in accordance with a first, second, third, and fourth embodiments of the invention, respectively.

FIG. 1, FIG. 3, FIG. 5, and FIG. 7 are lens layout diagrams of the lens assemblies in accordance with the first, second, third, and fourth embodiments of the invention, respectively.

The first lenses L11, L21, L31, L41 are meniscus lenses with negative refractive power and made of glass material, wherein the object side surfaces S11, S21, S31, S41 are convex surfaces, the image side surfaces S12, S22, S32, S42 are concave surfaces, and both of the object side surfaces S11, S21 S31, S41 and image side surfaces S12, S22, S32, S42 are spherical surfaces.

The second lenses L12, L22, L32, L42 are made of glass material, wherein both of the object side surfaces S13, S23, S33, S43 and image side surfaces S14. S24, S34, S44 are spherical surfaces.

The third lenses L13, L23, L33, L43 are made of glass material, wherein the object side surfaces S15, S25, S35. S45 are convex surfaces and both of the object side surfaces S15, S25, S35, S45 and image side surfaces S16, S26, S36, S46 are spherical surfaces.

The fourth lenses L14, L24, L34, L44 are biconvex lenses with positive refractive power and made of glass material, wherein the object side surfaces S18, S28, S38, S48 are convex surfaces, the image side surfaces S19, S29, S39, S49 are convex surfaces, and both of the object side surfaces S18, S28, S38, S48 and image side surfaces S19, S29, S39, S49 are spherical surfaces.

The fifth lenses L15, L25, L35, L45 are made of glass material, wherein both of the object side surfaces S110, S210, S310, S410 and image side surfaces S111, S211, S311, S411 are spherical surfaces.

The sixth lenses L16, L26, L36, L46 are made of glass material, wherein the object side surfaces S112, S212, S312, S412 are concave surfaces and both of the object side surfaces S112, S212, S312, S412 and image side surfaces S113, S213, S313, S413 are spherical surfaces.

The seventh lenses L17, L27, L37, L47 are biconvex lenses with positive refractive power and made of glass material, wherein the object side surfaces S114, S214 S314, S414 are convex surfaces, the image side surfaces S115 S215 S315, S415 are convex surfaces, and both of the object side surfaces S114, S214, S314, S414 and image side surfaces S115, S215, S315, S415 are spherical surfaces.

In addition, the lens assemblies 1, 2, 3, 4 satisfy at least one of the following conditions:

$$0.7 < f/IH < 1.5; \quad (1)$$

$$3 < TTL/BFL < 5; \quad (2)$$

$$-15 < (R_{21} - R_{22})/(R_{21} + R_{22}) < 0.8; \quad (3)$$

$$-6 < R_{61}/R_{31} < 30; \quad (4)$$

$$-4 < f_2/f_6 < 7; \quad (5)$$

$$0.2 < Vd_5/Vd_6 < 3; \quad (6)$$

$$-3 < f_{123}/f_{4567} < 2; \quad (7)$$

wherein f is an effective focal length of the lens assemblies 1, 2, 3, 4 for the first to fourth embodiments, $f_2$ is an effective focal length of the second lenses L12, l22, L32, L42 for the first to fourth embodiments, $f_6$ is an effective focal length of the sixth lenses L16, l26, L36, L46 for the first to fourth embodiments, $f_{123}$ is an effective focal length of a combination of the first lenses L11, L21, L31, L41, the second lenses L12, L22, L32, L42, and the third lenses L13 L23, L33, L43 for the first to fourth embodiments, $f_{4567}$ is an effective focal length of a combination of the fourth lenses L14, L24 L34, L44, the fifth lenses L15, L25, L35, L45, the sixth lenses L16 L26, L36, L46, and the seventh lenses L17, L27, L37, L47 for the first to fourth embodiments, IH is a half image height of the lens assemblies 1, 2, 3, 4 for the first to fourth embodiments, TTL is respectively an interval from the object side surfaces S11, S21, S31 S41 of the first lenses L11, L21, L31, L41 to the image planes IMA1, IMA2, IMA3, IMA4 along the optical axes OA1, OA2, OA3, OA4 for the first to fourth embodiments, BFL is respectively an interval from the image side surfaces S115, S215, S315, S415 of the seventh lenses L17, L27, L37, L47 to the image planes IMA1, IMA2, IMA3, IMA4 along the optical axes OA1, OA2, OA3, OA4 for the first to fourth embodiments, $R_{21}$ is a radius of curvature of the object side surfaces S13, S23, S33, S43 of the second lenses L12, L22, L32, L42 for the first to fourth embodiments, $R_{22}$ is a radius of curvature of the image side surfaces S14, S24, S34, S44 of the second lenses L12, L22, L32, L42 for the first to fourth embodiments, $R_{31}$ is a radius of curvature of the object side surfaces S15, S25, S35, S45 of the third lenses L13, L23, L33, L43 for the first to fourth embodiments, $R_{61}$ is a radius of curvature of the object side surfaces S112, S212, S312, S412 of the sixth lenses L16, L26, L36, L46 for the first to fourth embodiments, $Vd_5$ is an Abbe number of the fifth lenses L15, L25, L35, L45 for the first to fourth embodiments, and $Vd_6$ is an Abbe number of the sixth lenses L16, L26, L36, L46 for the first to fourth embodiments. With the lens assemblies 1, 2, 3, 4 satisfying at least one of the above conditions (1)-(7), the total lens length can be effectively shortened, the field of view can be effectively increased, the resolution can be effectively increased, the environmental temperature change can be effectively resisted, the aberration can be effectively corrected, and the chromatic aberration can be effectively corrected.

When the condition (1): $0.7<f/IH<1.5$ is satisfied, the refractive power of the lens assembly is sufficient to control the field of view and of benefit to correct aberration.

When the condition (2): $3<TTL/BFL<5$ is satisfied, the total lens length of the lens assembly can be shortened.

When the condition (3): $-15<(R_{21}-R_{22})/(R_{21}+R_{22})<0.8$ is satisfied, the refractive power of the lens assembly is sufficient to control the field of view and of benefit to correct aberration.

When the condition (4): $-6<R_{61}/R_{31}<30$ is satisfied, can have proper radius of curvature to correct distortion.

When the condition (5): $-4<f_2/f_6<7$ is satisfied, the aberration can be corrected and the resolution can be increased.

When the condition (6): $0.2<Vd_5/Vd_6<3$ is satisfied, the aberration can be corrected and the resolution can be increased.

When the condition (7): $-3<f_{123}/f_{4567}<2$ is satisfied, the aberration can be corrected and the resolution can be increased.

The common effect of condition (1): $0.7<f/IH<1.5$ and condition (2): $3<TTL/BFL<5$ is to provide a larger field of view for the lens assembly.

A detailed description of a lens assembly in accordance with a first embodiment of the invention is as follows. Referring to FIG. 1, the lens assembly 1 includes a first lens L11, a second lens L12, a third lens L13, a stop ST1, a fourth lens L14, a fifth lens L15, a sixth lens L16, a seventh lens L17, and an optical filter OF1, all of which are arranged in order from an object side to an image side along an optical axis OA1. In operation, the light from the object side is imaged on an image plane IMA1.

According to the foregoing, wherein: the second lens L12 is a meniscus lens with negative refractive power, wherein the object side surface S13 is a concave surface and the image side surface S14 is a convex surface; the third lens L13 is a biconvex lens with positive refractive power, wherein the object side surface S15 is a convex surface; the fifth lens L15 is a biconvex lens with positive refractive power, wherein the object side surface S110 is a convex surface and the image side surface S111 is a convex surface; the sixth lens L16 is a biconcave lens with negative refractive power, wherein the image side surface S113 is a concave surface; and both of the object side surface S116 and image side surface S117 of the optical filter OF1 are plane surfaces.

With the above design of the lenses, stop ST1, and at least one of the conditions (1)-(7) satisfied, the lens assembly 1 can have an effective shortened total lens length, an effective increased field of view, an effective increased resolution, an effective resisted environmental temperature change, an effective corrected aberration, and an effective corrected chromatic aberration.

Table 1 shows the optical specification of the lens assembly 1 in FIG. 1.

TABLE 1

Effective Focal Length = 5.65 F-number = 1.80
Total Lens Length = 27.82 mm Field of View = 98.50

| Surface Number | Radius of Curvature (mm) | Thickness (mm) | Nd | Vd | Effective Focal Length (mm) | Remark |
| --- | --- | --- | --- | --- | --- | --- |
| S11 | 40.17 | 0.70 | 1.618 | 63.4 | −7.4385 | L11 |
| S12 | 4.11 | 3.74 | | | | |
| S13 | −7.40 | 0.70 | 1.51 | 63.4 | −39.953 | L12 |
| S14 | −11.97 | 1.66 | | | | |
| S15 | 52.64 | 1.29 | 1.788 | 47.5 | 17.9089 | L13 |
| S16 | −19.17 | 0.12 | | | | |
| S17 | ∞ | 1.90 | | | | ST1 |
| S18 | 16.99 | 3.41 | 1.516 | 64 | 10.3963 | L14 |
| S19 | −7.30 | 0.20 | | | | |
| S110 | 13.44 | 2.86 | 1.55 | 75.5 | 11.3541 | L15 |
| S111 | −10.84 | 0.20 | | | | |
| S112 | −13.07 | 0.70 | 1.805 | 25.5 | −6.3888 | L16 |
| S113 | 8.79 | 1.08 | | | | |
| S114 | 36.42 | 1.87 | 1.729 | 54.7 | 14.6541 | L17 |
| S115 | −14.87 | 4.13 | | | | |
| S116 | ∞ | 0.90 | 1.517 | 64.2 | | OF1 |
| S117 | ∞ | 2.38 | | | | |

Table 2 shows the parameters and condition values for conditions (1)-(7) in accordance with the first embodiment of the invention. It can be seen from Table 2 that the lens assembly 1 of the first embodiment satisfies the conditions (1)-(7).

TABLE 2

| IH | 4.73 mm | $f_{123}$ | −16.97 mm | $f_{4567}$ | 9.51 mm |
| --- | --- | --- | --- | --- | --- |
| f/IH | 1.20 | TTL/BFL | 3.76 | $(R_{21} - R_{22})/(R_{21} + R_{22})$ | −0.24 |
| $R_{61}/R_{31}$ | −0.25 | $f_2/f_6$ | 6.25 | $Vd_5/Vd_6$ | 2.96 |
| $f_{123}/f_{4567}$ | −1.78 | | | | |

Figure 2A:
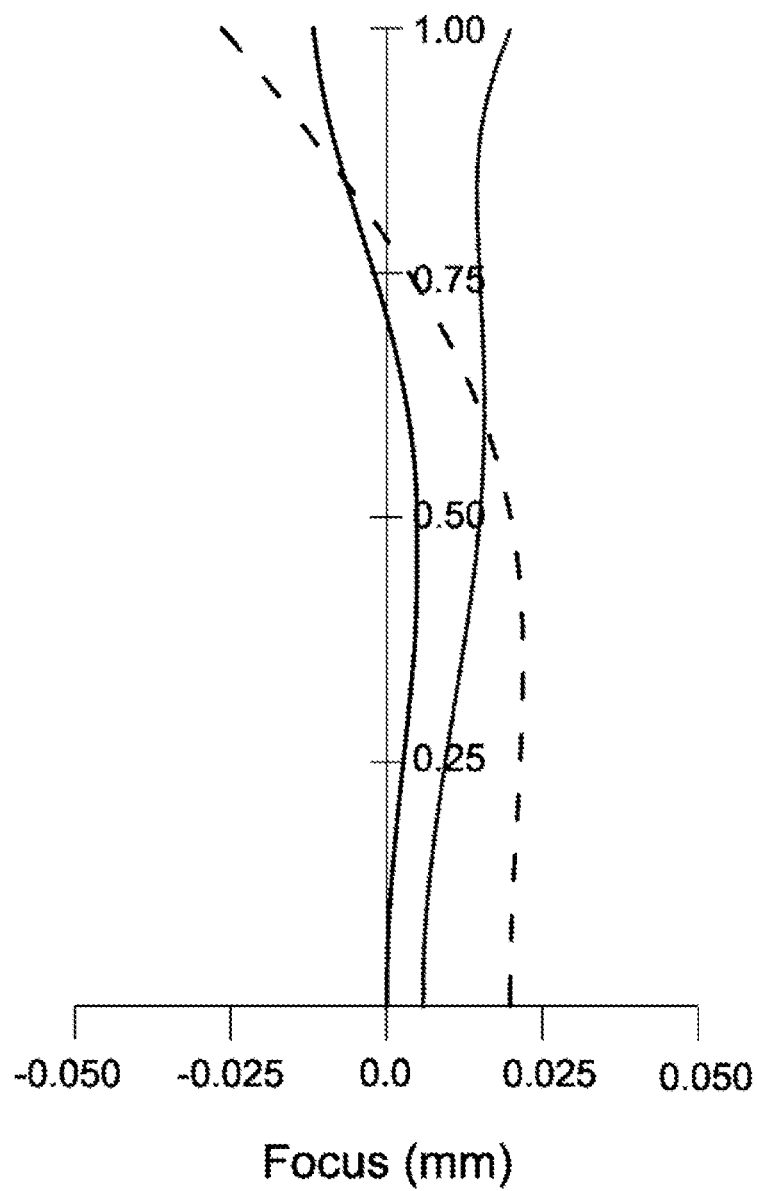
FIG. 2A, FIG. 2B, and FIG. 2C depict a longitudinal spherical aberration diagram, an astigmatic field curves diagram, and a distortion diagram of the lens assembly in accordance with the first embodiment of the invention, respectively.
Figure 2B:
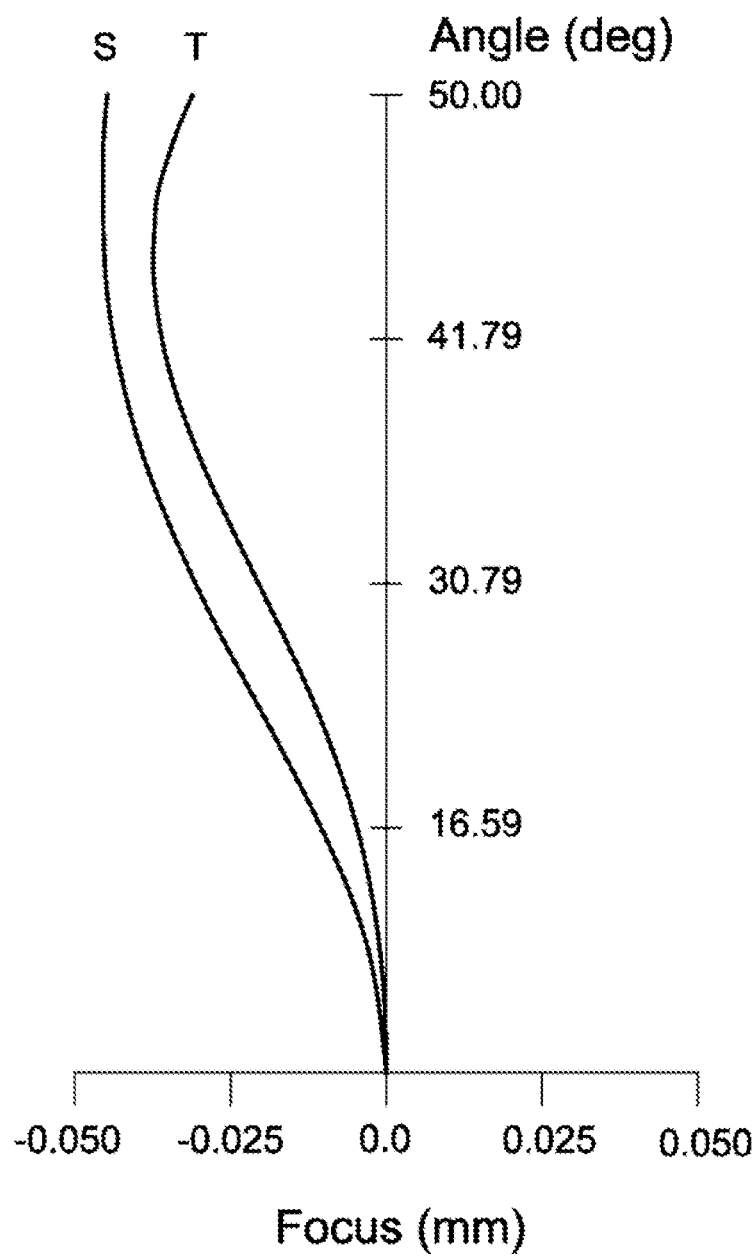
Figure 2C:
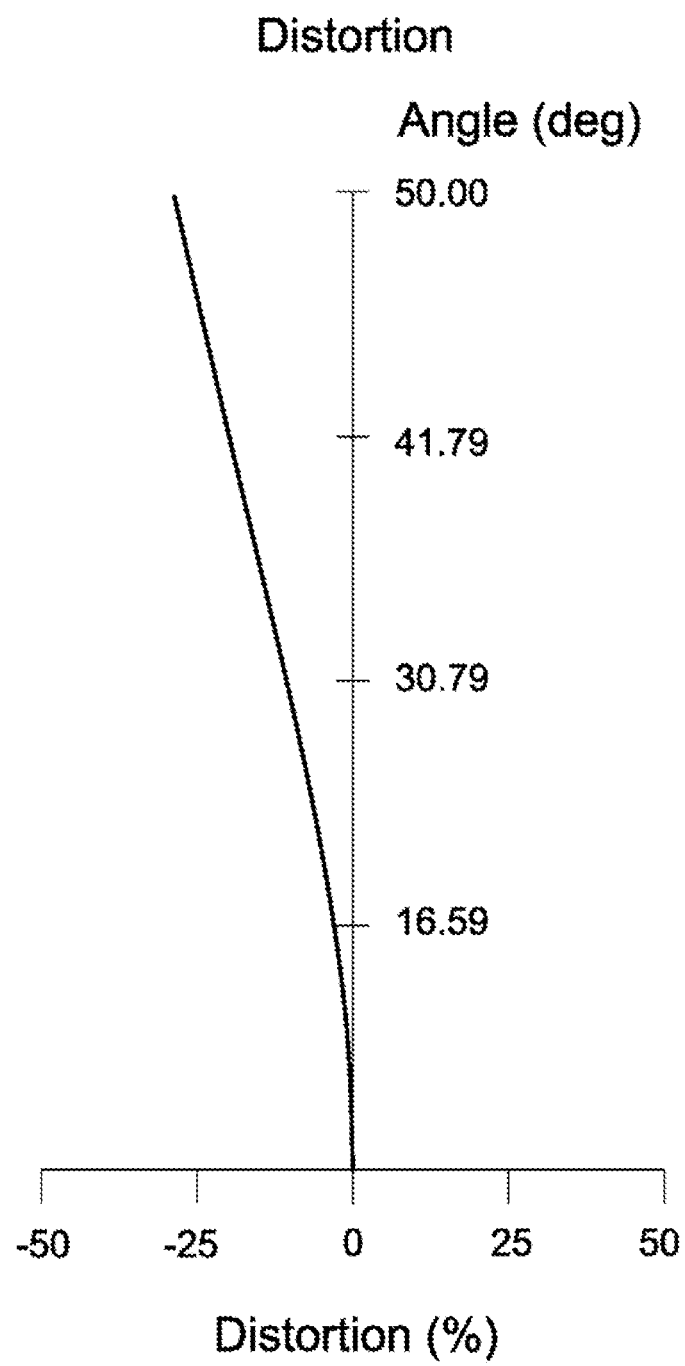

In addition, the lens assembly 1 of the first embodiment can meet the requirements of optical performance as seen in FIGS. 2A-2C. It can be seen from FIG. 2A that the longitudinal spherical aberration in the lens assembly 1 of the first embodiment ranges from −0.025 mm to 0.025 mm. It can be seen from FIG. 2B that the astigmatic field curves of tangential direction and sagittal direction in the lens assembly 1 of the first embodiment ranges from −0.050 mm to 0.0 mm. It can be seen from FIG. 2C that the distortion in the lens assembly 1 of the first embodiment ranges from −30% to 0%. It is obvious that the longitudinal spherical aberration, the astigmatic field curves, and the distortion of the lens assembly 1 of the first embodiment can be corrected effectively. Therefore, the lens assembly 1 of the first embodiment is capable of good optical performance.

Figure 3:
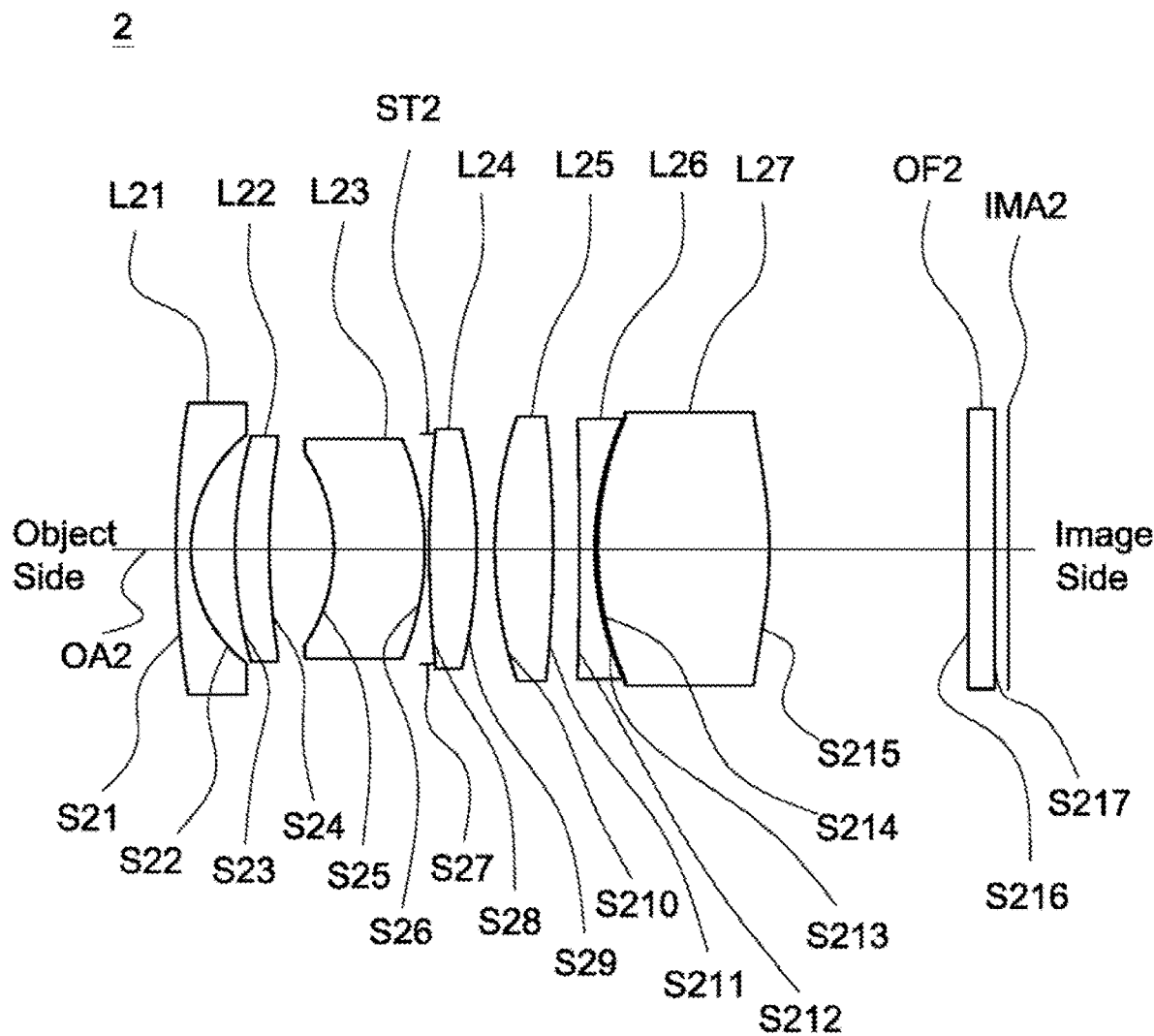
FIG. 3 is a lens layout diagram of a lens assembly in accordance with a second embodiment of the invention.

Referring to FIG. 3, the lens assembly 2 includes a first lens L21, a second lens L22, a third lens L23, a stop ST2, a fourth lens L24, a fifth lens L25, a sixth lens L26, a seventh lens L27, and an optical filter OF2, all of which are arranged in order from an object side to an image side along an optical axis OA2. In operation, the light from the object side is imaged on an image plane IMA2.

According to the foregoing, wherein: the second lens L22 is a meniscus lens with positive refractive power, wherein the object side surface S23 is a convex surface and the image side surface S24 is a concave surface; the third lens L23 is a meniscus lens with negative refractive power, wherein the object side surface S25 is a concave surface; the fifth lens L25 is a biconvex lens with positive refractive power, wherein the object side surface S210 is a convex surface and the image side surface S211 is a convex surface; the sixth lens L26 is a biconcave lens with negative refractive power, wherein the image side surface S213 is a concave surface; and both of the object side surface S216 and image side surface S217 of the optical filter OF2 are plane surfaces.

With the above design of the lenses, stop ST2, and at least one of the conditions (1)-(7) satisfied, the lens assembly 2 can have an effective shortened total lens length, an effective increased field of view, an effective increased resolution, an effective resisted environmental temperature change, an effective corrected aberration, and an effective corrected chromatic aberration.

Table 3 shows the optical specification of the lens assembly 2 in FIG. 3.

TABLE 3

Effective Focal Length = 6.68 F-number = 1.60
Total Lens Length = 28.01 mm Field of View = 82.30 degrees

| Surface Number | Radius of Curvature (mm) | Thickness (mm) | Nd | Vd | Effective Focal Length (mm) | Remark |
|---|---|---|---|---|---|---|
| S21 | 30.00 | 0.50 | 1.589 | 61.1 | −10.037 | L21 |
| S22 | 4.92 | 1.49 | | | | |
| S23 | 13.86 | 1.14 | 1.946 | 18 | 36.9146 | L22 |
| S24 | 21.92 | 2.20 | | | | |
| S25 | −5.83 | 3.05 | 1.87 | 20 | −30.009 | L23 |
| S26 | −9.33 | 0.10 | | | | |
| S27 | ∞ | 0.04 | | | | ST2 |
| S28 | 38.18 | 1.59 | 1.804 | 46.6 | 14.7361 | L24 |
| S29 | −16.96 | 0.62 | | | | |
| S210 | 13.60 | 1.95 | 1.729 | 54.7 | 14.4253 | L25 |
| S211 | −44.21 | 0.93 | | | | |
| S212 | −153.99 | 0.50 | 1.87 | 20 | −11.24 | L26 |
| S213 | 10.55 | 0.10 | | | | |
| S214 | 10.76 | 5.77 | 1.619 | 63.9 | 10.7135 | L27 |
| S215 | −13.82 | 6.70 | | | | |
| S216 | ∞ | 0.90 | 1.523 | 54.5 | | OF2 |
| S217 | ∞ | 0.45 | | | | |

Table 4 shows the parameters and condition values for conditions (1)-(7) in accordance with the second embodiment of the invention. It can be seen from Table 4 that the lens assembly 2 of the second embodiment satisfies the conditions (1)-(7).

TABLE 4

| IH | 4.73 mm | $f_{123}$ | −9.633 mm | $f_{4567}$ | 8.203 mm |
|---|---|---|---|---|---|
| f/IH | 1.41 | TTL/BFL | 3.48 | $(R_{21} - R_{22})/(R_{21} + R_{22})$ | −0.23 |
| $R_{61}/R_{31}$ | 26.40 | $f_2/f_6$ | −3.28 | $Vd_5/Vd_6$ | 2.74 |
| $f_{123}/f_{4567}$ | −1.17 | | | | |

Figure 4A:
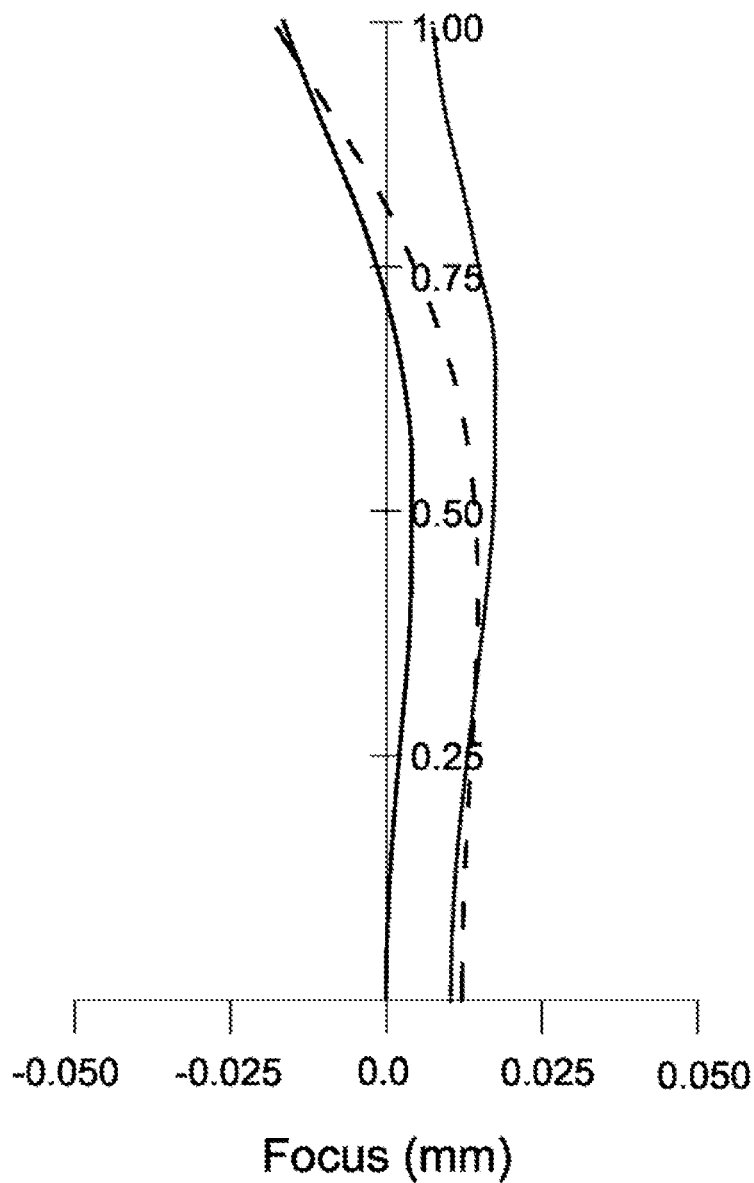
FIG. 4A, FIG. 4B, and FIG. 4C depict a longitudinal spherical aberration diagram, an astigmatic field curves diagram, and a distortion diagram of the lens assembly in accordance with the second embodiment of the invention, respectively.
Figure 4B:
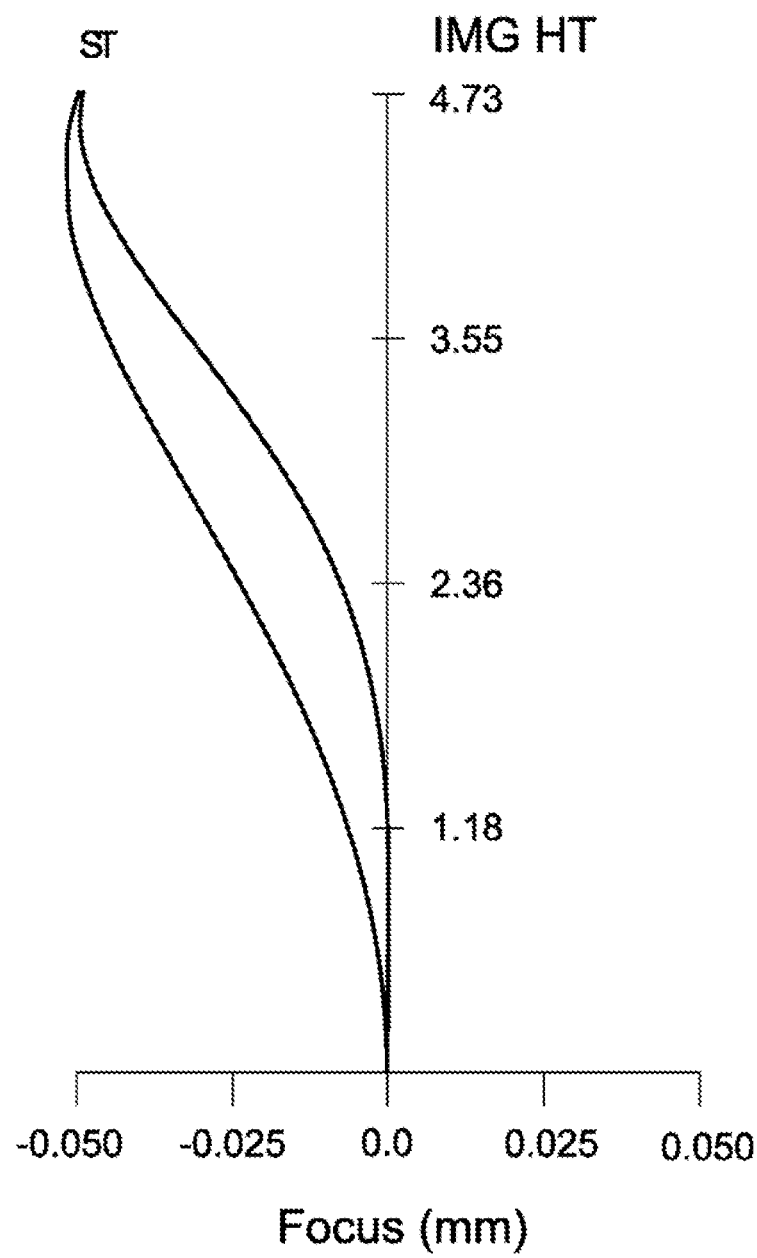
Figure 4C:
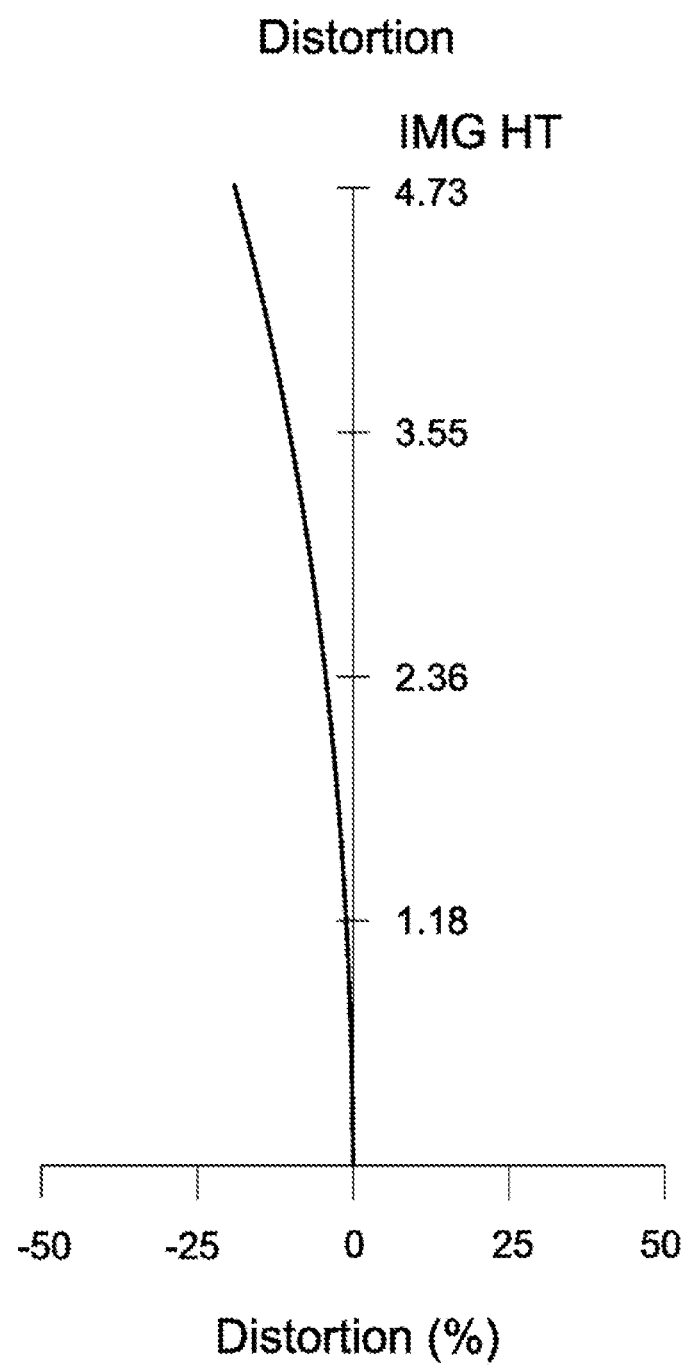

In addition, the lens assembly 2 of the second embodiment can meet the requirements of optical performance as seen in FIGS. 4A-4C. It can be seen from FIG. 4A that the longitudinal spherical aberration in the lens assembly 2 of the second embodiment ranges from −0.025 mm to 0.025 mm. It can be seen from FIG. 4B that the astigmatic field curves of tangential direction and sagittal direction in the lens assembly 2 of the second embodiment ranges from −0.050 mm to 0.0 mm. It can be seen from FIG. 4C that the distortion in the lens assembly 2 of the second embodiment ranges from −25% to 0%. It is obvious that the longitudinal spherical aberration, the astigmatic field curves, and the distortion of the lens assembly 2 of the second embodiment can be corrected effectively. Therefore, the lens assembly 2 of the second embodiment is capable of good optical performance.

Figure 5:
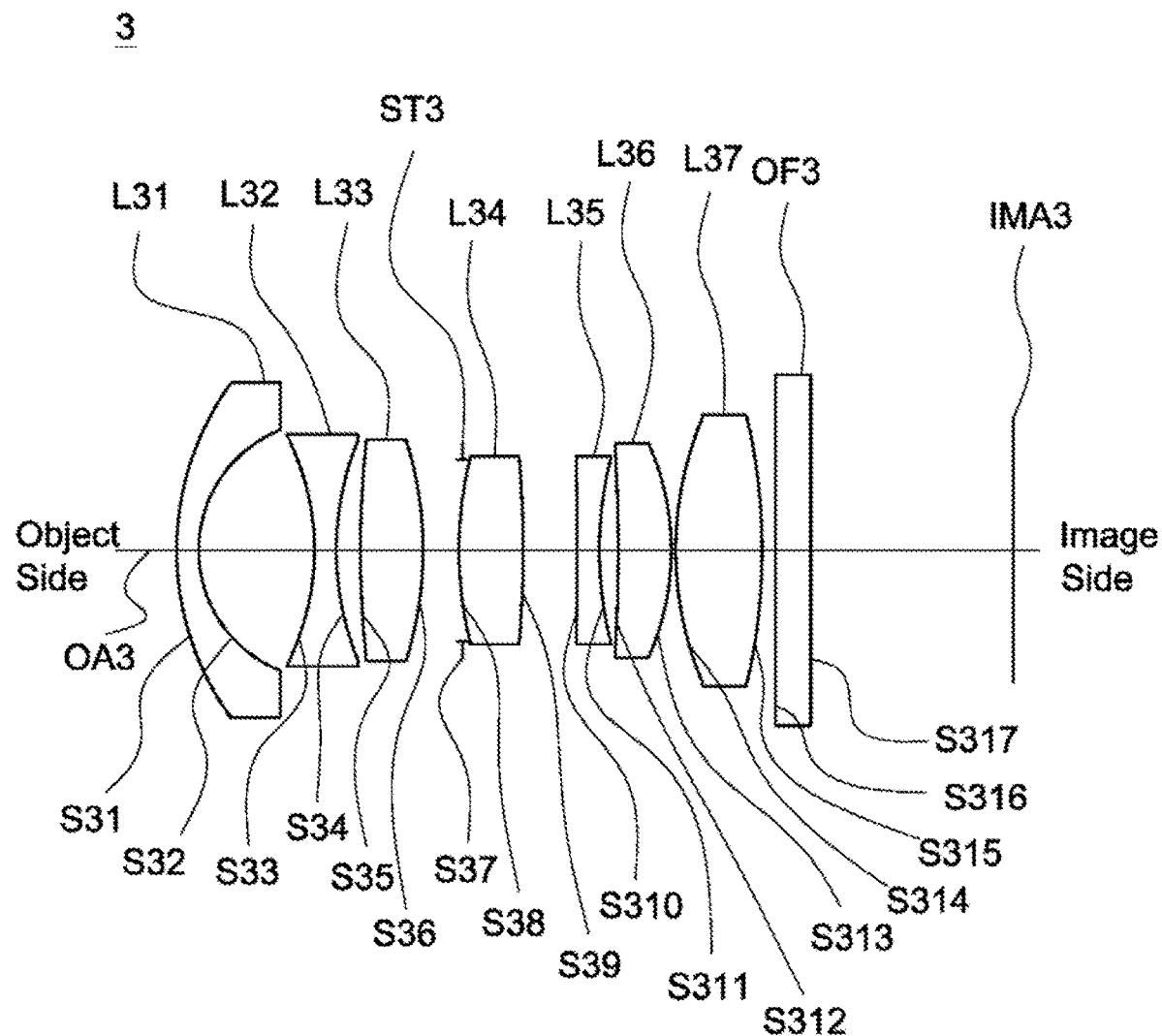
FIG. 5 is a lens layout diagram of a lens assembly in accordance with a third embodiment of the invention.

Referring to FIG. 5, the lens assembly 3 includes a first lens L31, a second lens L32, a third lens L33, a stop ST3, a fourth lens L34, a fifth lens L35, a sixth lens L36, a seventh lens L37, and an optical filter OF3, all of which are arranged in order from an object side to an image side along an optical axis OA3. In operation, the light from the object side is imaged on an image plane IMA3.

According to the foregoing, wherein: the second lens L32 is a biconcave lens with negative refractive power, wherein the object side surface S33 is a concave surface and the image side surface S34 is a concave surface; the third lens L33 is a biconvex lens with positive refractive power, wherein the object side surface S35 is a convex surface; the fifth lens L35 is a biconcave lens with negative refractive power, wherein the object side surface S310 is a concave surface and the image side surface S311 is a concave surface; the sixth lens L36 is a meniscus lens with positive refractive power, wherein the image side surface S313 is a convex surface; and both of the object side surface S316 and image side surface S317 of the optical filter OF3 are plane surfaces.

With the above design of the lenses, stop ST3, and at least one of the conditions (1)-(7) satisfied, the lens assembly 3 can have an effective shortened total lens length, an effective increased field of view, an effective increased resolution, an effective resisted environmental temperature change, an effective corrected aberration, and an effective corrected chromatic aberration.

Table 5 shows the optical specification of the lens assembly 3 in FIG. 5.

TABLE 5

Effective Focal Length = 3.78 mm F-number = 1.65
Total Lens Length = 19.00 mm Field of View = 96.40 degrees

| Surface Number | Radius of Curvature (mm) | Thickness (mm) | Nd | Vd | Effective Focal Length (mm) | Remark |
|---|---|---|---|---|---|---|
| S31 | 6.57 | 0.50 | 1.49 | 70.2 | −11.59 | L31 |
| S32 | 2.97 | 2.64 | | | | |
| S33 | −5.81 | 0.50 | 1.59 | 61.2 | −5.21 | L32 |
| S34 | 6.74 | 0.55 | | | | |
| S35 | 24.97 | 1.41 | 1.95 | 32.3 | 6.74 | L33 |
| S36 | −8.39 | 0.90 | | | | |
| S37 | ∞ | −0.08 | | | | ST3 |
| S38 | 8.73 | 1.46 | 1.59 | 68.6 | 11.03 | L34 |
| S39 | −23.97 | 1.24 | | | | |
| S310 | −105.16 | 0.50 | 1.99 | 16.5 | −8.08 | L35 |
| S311 | 8.68 | 0.42 | | | | |
| S312 | −45.67 | 1.21 | 1.73 | 54.7 | 9.47 | L36 |
| S313 | −6.07 | 0.10 | | | | |

TABLE 5-continued

Effective Focal Length = 3.78 mm F-number = 1.65
Total Lens Length = 19.00 mm Field of View = 96.40 degrees

| Surface Number | Radius of Curvature (mm) | Thickness (mm) | Nd | Vd | Effective Focal Length (mm) | Remark |
|---|---|---|---|---|---|---|
| S314 | 7.89 | 1.96 | 1.62 | 63.9 | 8.32 | L37 |
| S315 | −13.48 | 0.30 | | | | |
| S316 | ∞ | 0.80 | 1.52 | 54.5 | | OF3 |
| S317 | ∞ | 4.6 | | | | |

Table 6 shows the parameters and condition values for conditions (1)-(7) in accordance with the third embodiment of the invention. It can be seen from Table 6 that the lens assembly 3 of the third embodiment satisfies the conditions (1)-(7).

TABLE 6

| IH | 3.00 mm | $f_{123}$ | −12.977 mm | $f_{4567}$ | 5.838 mm |
|---|---|---|---|---|---|
| f/IH | 1.26 | TTL/BFL | 3.33 | $(R_{21} - R_{22})/(R_{21} + R_{22})$ | −13.44 |
| $R_{61}/R_{31}$ | −1.83 | $f_2/f_6$ | −0.55 | $Vd_5/Vd_6$ | 0.30 |
| $f_{123}/f_{4567}$ | −2.22 | | | | |

Figure 6A:
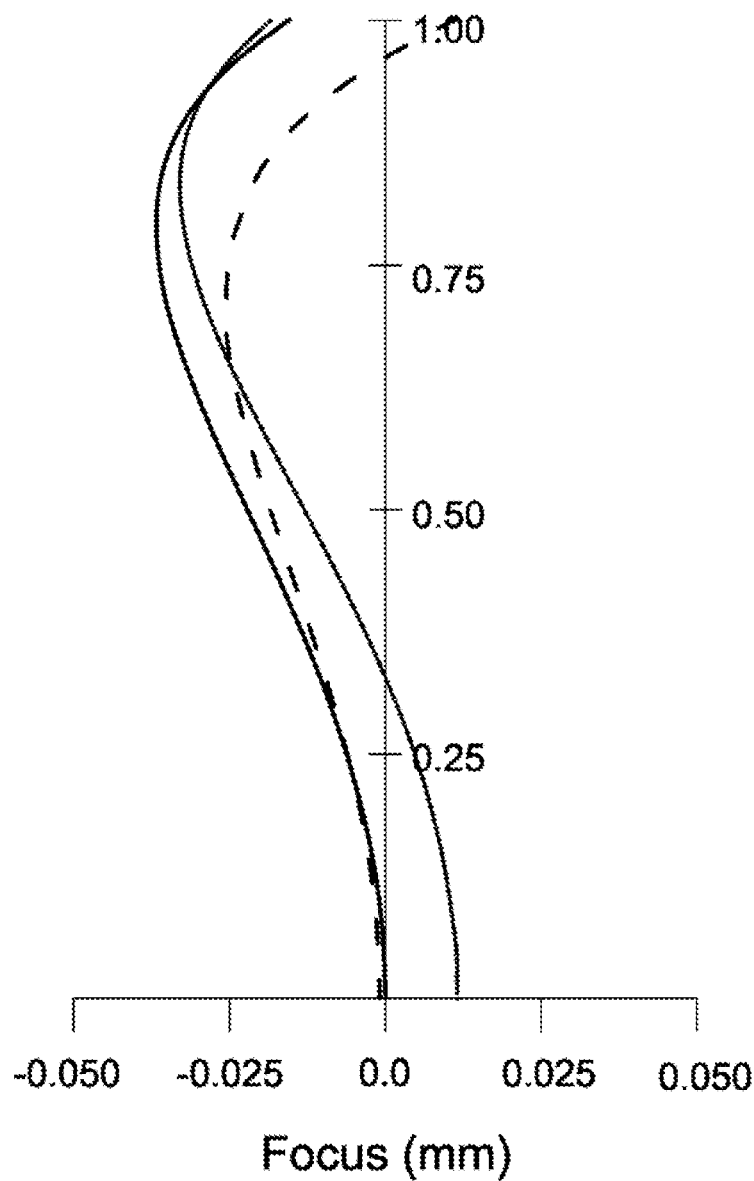
FIG. 6A, FIG. 6B, and FIG. 6C depict a longitudinal spherical aberration diagram, an astigmatic field curves diagram, and a distortion diagram of the lens assembly in accordance with the third embodiment of the invention, respectively.
Figure 6B:
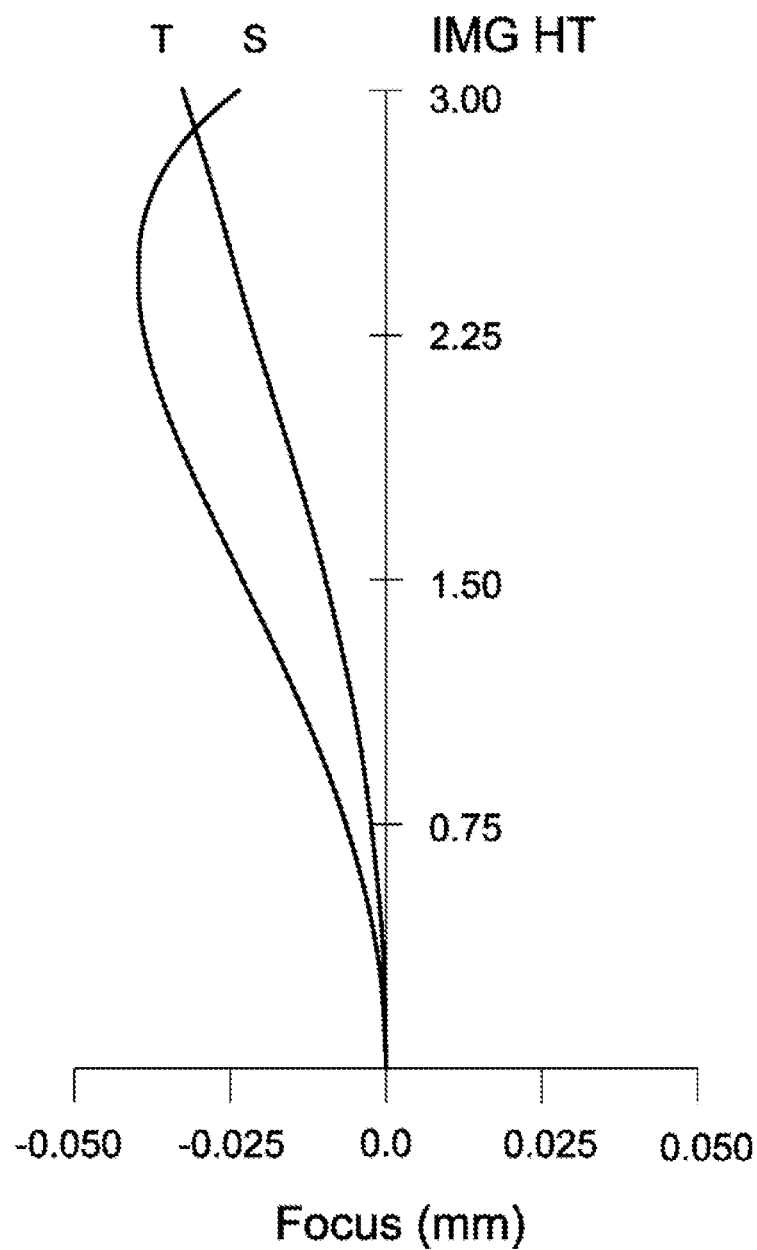
Figure 6C:
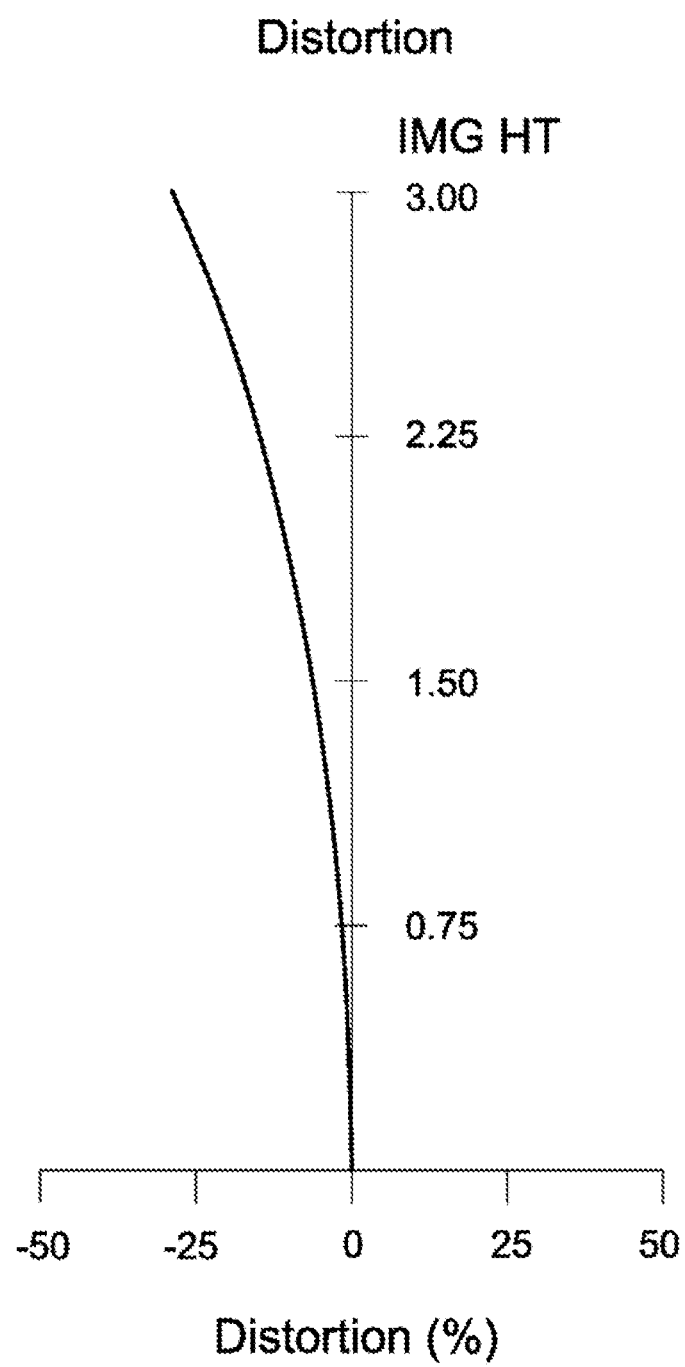

In addition, the lens assembly 3 of the third embodiment can meet the requirements of optical performance as seen in FIGS. 6A-6C. It can be seen from FIG. 6A that the longitudinal spherical aberration in the lens assembly 3 of the third embodiment ranges from −0.050 mm to 0.025 mm. It can be seen from FIG. 6B that the astigmatic field curves of tangential direction and sagittal direction in the lens assembly 3 of the third embodiment ranges from −0.050 mm to 0.0 mm. It can be seen from FIG. 6C that the distortion in the lens assembly 3 of the third embodiment ranges from −30% to 0%. It is obvious that the longitudinal spherical aberration, the astigmatic field curves, and the distortion of the lens assembly 3 of the third embodiment can be corrected effectively. Therefore, the lens assembly 3 of the third embodiment is capable of good optical performance.

Figure 7:
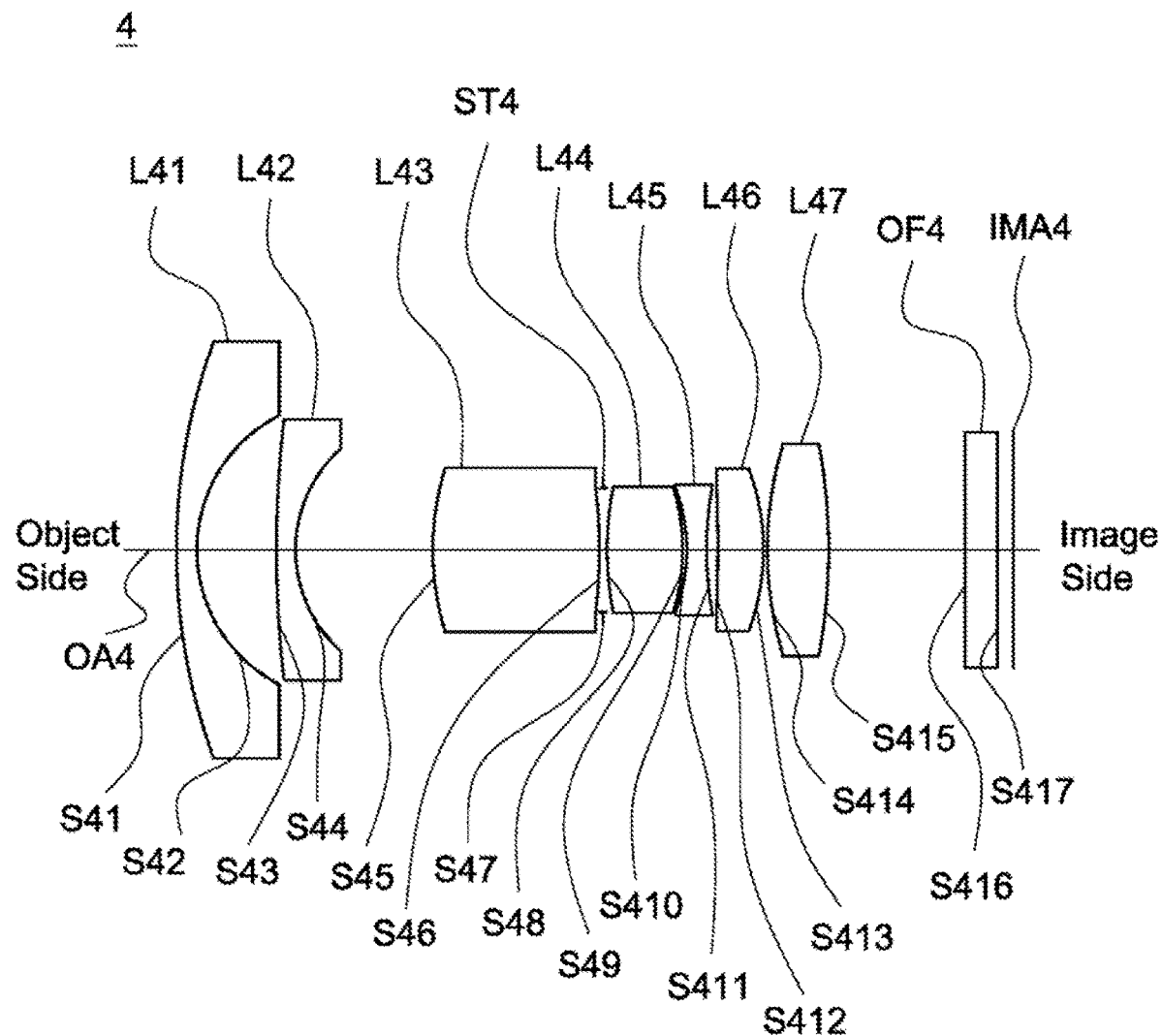
FIG. 7 is a lens layout diagram of a lens assembly in accordance with a fourth embodiment of the invention.

Referring to FIG. 7, the lens assembly 4 includes a first lens L41, a second lens L42, a third lens L43, a stop ST4, a fourth lens L44, a fifth lens L45, a sixth lens L46, a seventh lens L47, and an optical filter OF4, all of which are arranged in order from an object side to an image side along an optical axis OA4. In operation, the light from the object side is imaged on an image plane IMA4.

According to the foregoing, wherein: the second lens L42 is a meniscus lens with negative refractive power, wherein the object side surface S43 is a convex surface and the image side surface S44 is a concave surface; the third lens L43 is a biconvex lens with positive refractive power, wherein the object side surface S45 is a convex surface; the fifth lens L45 is a biconcave lens with negative refractive power, wherein the object side surface S410 is a concave surface and the image side surface S411 is a concave surface; the sixth lens L46 is a meniscus lens with positive refractive power, wherein the image side surface S413 is a convex surface; and both of the object side surface S416 and image side surface S417 of the optical filter OF4 are plane surfaces.

With the above design of the lenses, stop ST4, and at least one of the conditions (1)-(7) satisfied, the lens assembly 4 can have an effective shortened total lens length, an effective increased field of view, an effective increased resolution, an effective resisted environmental temperature change, an effective corrected aberration, and an effective corrected chromatic aberration.

Table 7 shows the optical specification of the lens assembly 4 in FIG. 7.

TABLE 7

Effective Focal Length = 2.35 mm F-number = 1.80
Total Lens Length = 21.00 mm Field of View = 154.00 degrees

| Surface Number | Radius of Curvature (mm) | Thickness (mm) | Nd | Vd | Effective Focal Length (mm) | Remark |
|---|---|---|---|---|---|---|
| S41 | 15.50 | 0.500 | 1.73 | 54.7 | −7.02 | L41 |
| S42 | 3.80 | 2.000 | | | | |
| S43 | 30.00 | 0.500 | 1.52 | 64.1 | −7.67 | L42 |
| S44 | 3.50 | 3.430 | | | | |
| S45 | 7.40 | 4.170 | 1.92 | 24 | 5.78 | L43 |
| S46 | −13.80 | 0.100 | | | | |
| S47 | ∞ | 0.100 | | | | ST4 |
| S48 | 8.50 | 1.900 | 1.62 | 63.4 | 5.68 | L44 |
| S49 | −5.50 | 0.100 | | | | |
| S410 | −4.50 | 0.500 | 2.1 | 17 | −2.7 | L45 |
| S411 | 9.20 | 0.280 | | | | |
| S412 | −40.00 | 1.140 | 1.91 | 35.3 | 7.34 | L46 |
| S413 | −5.80 | 0.100 | | | | |
| S414 | 9.30 | 1.530 | 1.88 | 40.8 | 6.72 | L47 |
| S415 | −15.00 | 0.200 | | | | |
| S416 | ∞ | 0.800 | 1.52 | 54.5 | | OF4 |
| S417 | ∞ | 3.645 | | | | |

Table 8 shows the parameters and condition values for conditions (1)-(7) in accordance with the fourth embodiment of the invention. It can be seen from Table 8 that the lens assembly 4 of the fourth embodiment satisfies the conditions (1)-(7).

TABLE 8

| IH | 3.00 mm | $f_{123}$ | 6.8255 mm | $f_{4567}$ | 6.806 mm |
|---|---|---|---|---|---|
| f/IH | 0.78 | TTL/BFL | 4.52 | $(R_{21} - R_{22})/(R_{21} + R_{22})$ | 0.79 |
| $R_{61}/R_{31}$ | −5.41 | $f_2/f_6$ | −1.04 | $Vd_5/Vd_6$ | 0.48 |
| $f_{123}/f_{4567}$ | 1.00 | | | | |

Figure 8A:
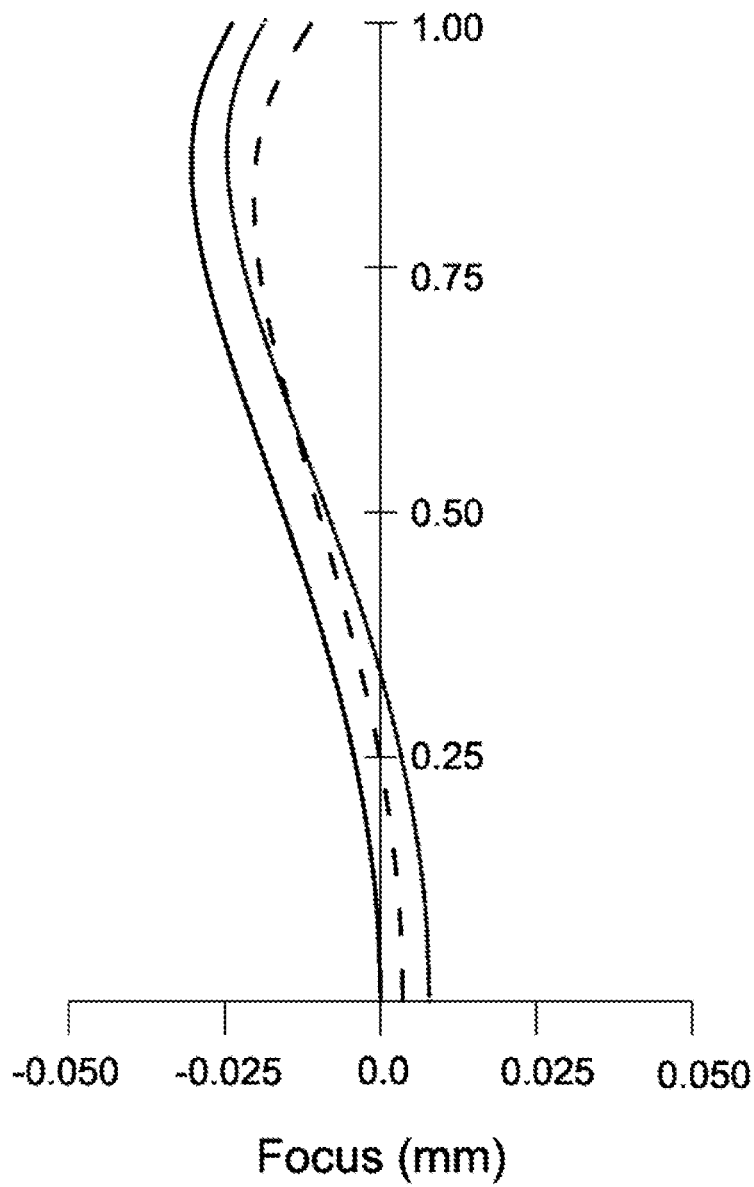
FIG. 8A, FIG. 8B, and FIG. 8C depict a longitudinal spherical aberration diagram, an astigmatic field curves diagram, and a distortion diagram of the lens assembly in accordance with the fourth embodiment of the invention, respectively.
Figure 8B:
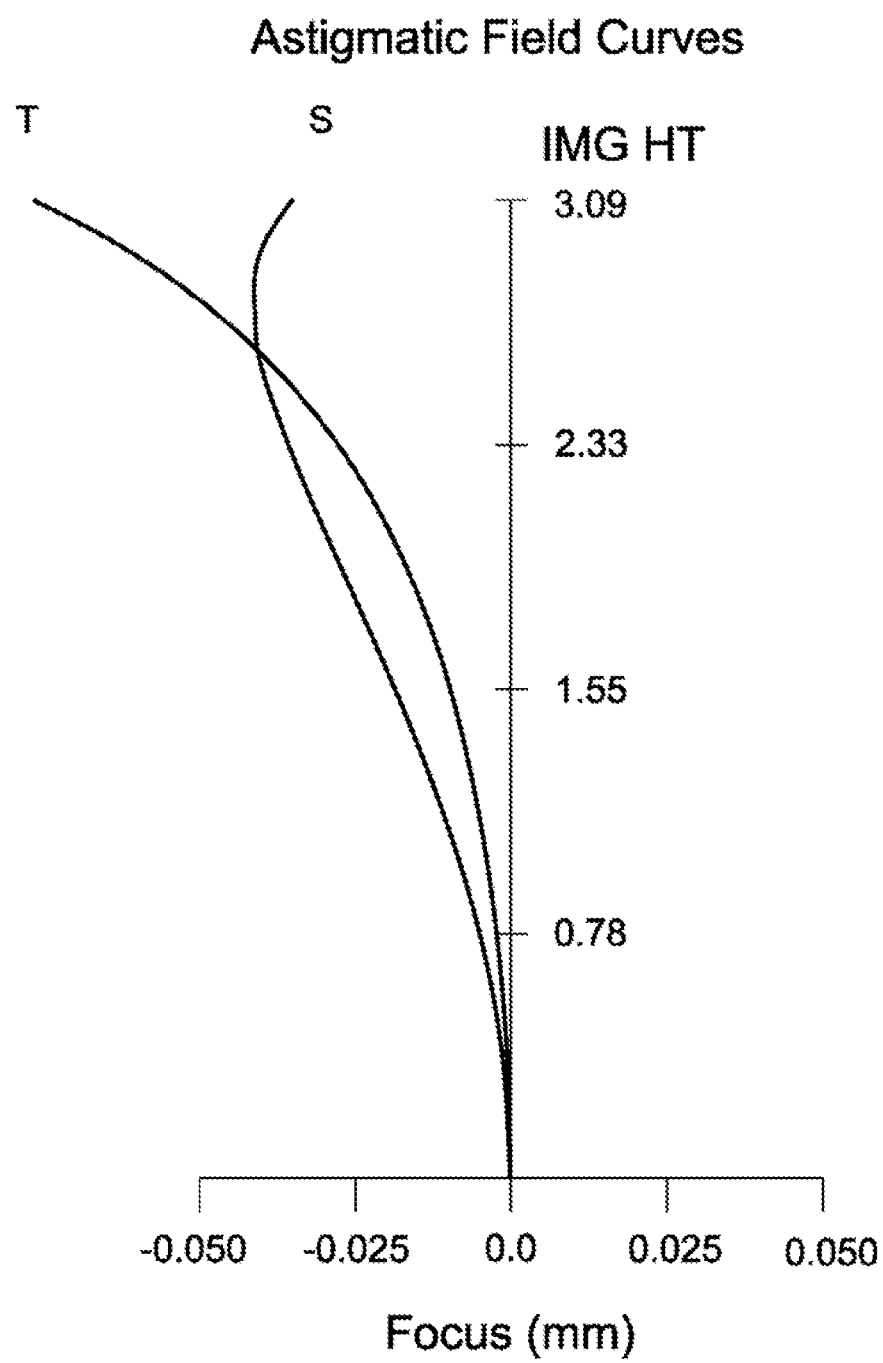
Figure 8C:
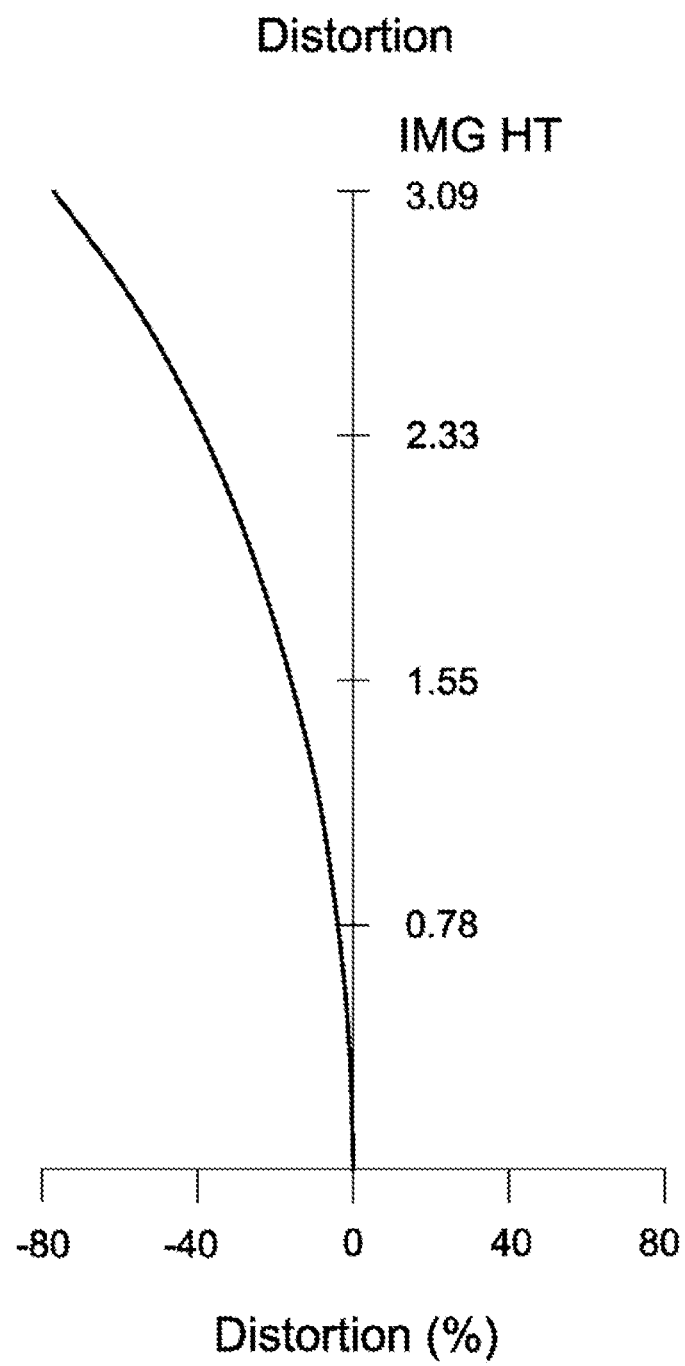

In addition, the lens assembly 4 of the fourth embodiment can meet the requirements of optical performance as seen in FIGS. 8A-8C. It can be seen from FIG. 8A that the longitudinal spherical aberration in the lens assembly 4 of the fourth embodiment ranges from −0.050 mm to 0.025 mm. It can be seen from FIG. 8B that the astigmatic field curves of tangential direction and sagittal direction in the lens assembly 4 of the fourth embodiment ranges from −0.075 mm to 0.0 mm. It can be seen from FIG. 8C that the distortion in the lens assembly 4 of the fourth embodiment ranges from −80% to 0%. It is obvious that the longitudinal spherical aberration, the astigmatic field curves, and the distortion of the lens assembly 4 of the fourth embodiment can be corrected effectively. Therefore, the lens assembly 4 of the fourth embodiment is capable of good optical performance.

Referring to Table 9, Table 10, Table 12, Table 13, Table 15, and Table 16, wherein Table 9, Table 12, and Table 15 show respectively optical specification in accordance with a fifth, sixth, and seventh embodiments of the invention and Table 10, Table 13, and Table 16 show respectively aspheric coefficients of each aspheric lens in Table 9, Table 12, and Table 15.

Figure 9:
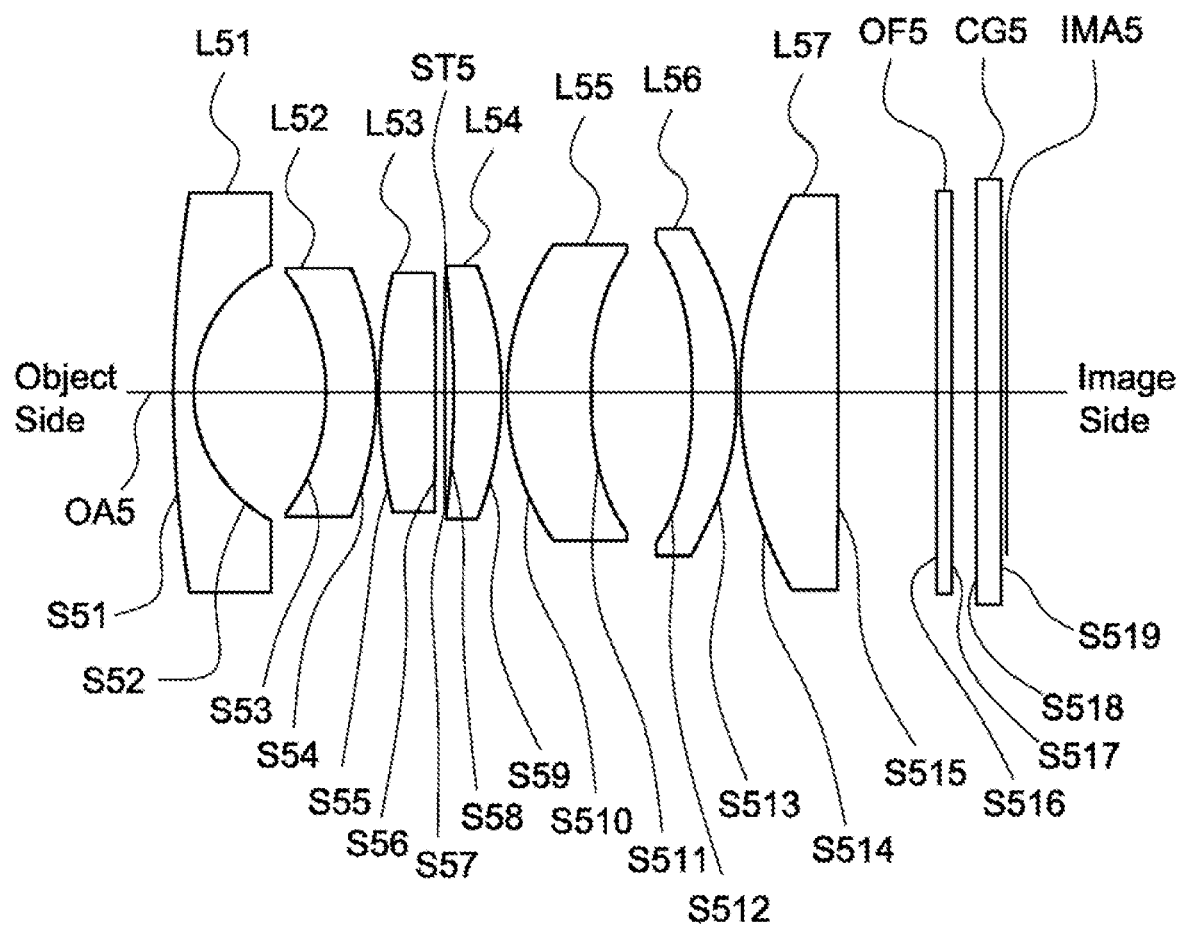
FIG. 9 is a lens layout diagram of a lens assembly in accordance with a fifth embodiment of the invention.
Figure 11:
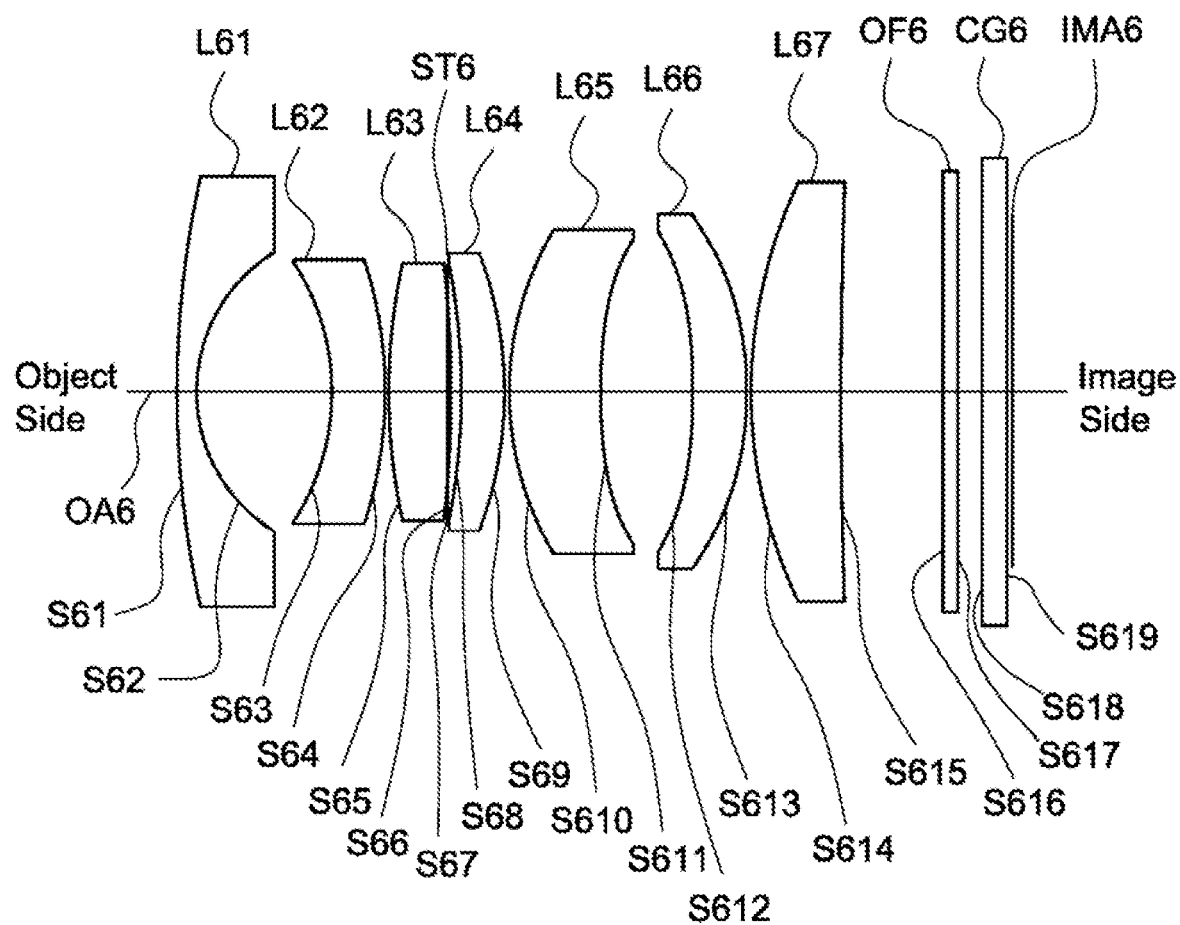
FIG. 11 is a lens layout diagram of a lens assembly in accordance with a sixth embodiment of the invention.
Figure 13:
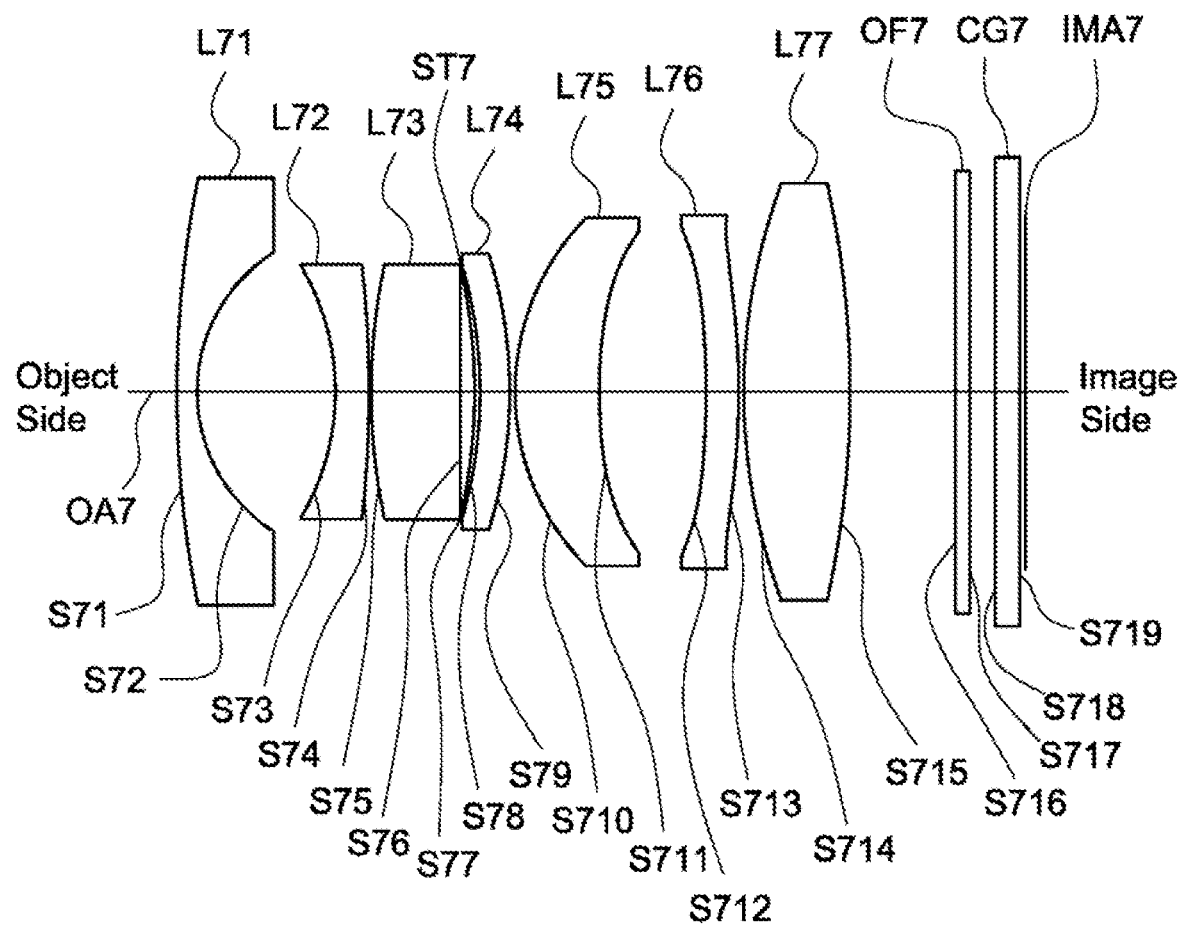
FIG. 13 is a lens layout diagram of a lens assembly in accordance with a seventh embodiment of the invention.

FIG. 9, FIG. 11, and FIG. 13 are lens layout diagrams of the lens assemblies in accordance with the fifth, sixth, and seventh embodiments of the invention, respectively.

The first lenses L51, L61, L71 are meniscus lenses with negative refractive power and made of glass material, wherein the object side surfaces S51, S61, S71 are convex surfaces, the image side surfaces S52, S62, S72 are concave surfaces, and both of the object side surfaces S51, S61, S71 and image side surfaces S52, S62, S72 are spherical surfaces.

The second lenses L52, L62, L72 are meniscus lenses with negative refractive power and made of plastic material, wherein the object side surfaces S53, S63, S73 are concave surfaces, the image side surfaces S54, S64, S74 are convex surfaces, and both of the object side surfaces S53, S63, S73 and image side surfaces S54, S64, S74 are aspheric surfaces.

The third lenses L53, L63, L73 are biconvex lenses with positive refractive power and made of glass material, wherein the object side surfaces S55, S65, S75 are convex surfaces, the image side surfaces S56, S66, S76 are convex surfaces, and both of the object side surfaces S55, S65, S75 and image side surfaces S56, S66 S76 are spherical surfaces.

The fourth lenses L54, L64, L74 are meniscus lenses with positive refractive power and made of glass material, wherein the object side surfaces S58, S68, S78 are concave surfaces, the image side surfaces S59, S69, S79 are convex surfaces, and both of the object side surfaces S58 S68, S78 and image side surfaces S59, S69, S79 are spherical surfaces.

The fifth lenses L55, L65, L75 are meniscus lenses with positive refractive power and made of plastic material, wherein the object side surfaces S510, S610. S710 are convex surfaces, the image side surfaces S511 S611, S711 are concave surfaces, and both of the object side surfaces S510, S610, S710 and image side surfaces S511, S611, S711 are aspheric surfaces.

The sixth lenses L56, L66, L76 are meniscus lenses with positive refractive power and made of plastic material, wherein the object side surfaces S512, S612, S712 are concave surfaces, the image side surfaces S513, S613, S713 are convex surfaces, and both of the object side surfaces S512, S612, S712 and image side surfaces S513, S613, S713 are aspheric surfaces.

The seventh lenses L57, L67, L77 are with positive refractive power and made of glass material, wherein the object side surfaces S514, S614, S714 are convex surfaces and both of the object side surfaces S514, S614, S714 and image side surfaces S515, S615, S715 are spherical surfaces.

In addition, the lens assemblies 5, 6, 7 satisfy at least one of the condition 1 and the following conditions:

$$0.7 < f_3/f_7 < 1.1; \quad (8)$$

$$0.5 < Gap23/Gap67 < 0.75; \quad (9)$$

$$-2 < R_{42}/R_{51} < -0.8; \quad (10)$$

wherein $f_3$ is an effective focal length of the third lenses L53, L63, L73 for the fifth to seventh embodiments, $f_7$ is an effective focal length of the seventh lenses L57, L67, L77 for the fifth to seventh embodiments, Gap23 is respectively an interval from the image side surfaces S54, S64, S74 of the second lenses L52, L62, L72 to the object side surfaces S55, S65, S75 of the third lenses L53, L63, L73 along the optical axes OA5, OA6, OA7 for the fifth to seventh embodiments, Gap67 is respectively an interval from the image side surfaces S513, S613, S713 of the sixth lenses L56 L66, L76 to the object side surfaces S514, S614, S714 of the seventh lenses L57, L67, L77 along the optical axes OA5, OA6, OA7 for the fifth to seventh embodiments, $R_{42}$ is a radius of curvature of the image side surfaces S59, S69, S79 of the fourth lenses L54, L64, L74 for the fifth to seventh embodiments, and $R_{51}$ is a radius of curvature of the object side surfaces S510, S610, S710 of the fifth lenses L55, L65, L75 for the fifth to seventh embodiments. With the lens assemblies 5, 6, 7, satisfying at least one of the above conditions (1), (8)-(10), the total lens length can be effectively shortened, the F-number can be effectively decreased, the resolution can be effectively increased, the environmental temperature change can be effectively resisted, the aberration can be effectively corrected, and the chromatic aberration can be effectively corrected.

When the condition (1): $0.7 < f/IH < 1.5$ is satisfied, the field of view of the lens assembly can be effectively increased.

When the condition (9): $0.5 < Gap23/Gap67 < 0.75$ is satisfied, the total lens length of the lens assembly can be effectively shortened.

When the condition (10): $-2 < R_{42}/R_{51} < -0.8$ is satisfied, the spherical aberration of the lens assembly can be effectively corrected.

A detailed description of a lens assembly in accordance with a fifth embodiment of the invention is as follows. Referring to FIG. 9, the lens assembly 5 includes a first lens L51, a second lens L52, a third lens L53, a stop ST5, a fourth lens L54, a fifth lens L55, a sixth lens L56, a seventh lens L57, an optical filter OF5, and a cover glass CG5, all of which are arranged in order from an object side to an image side along an optical axis OA5. In operation, the light from the object side is imaged on an image plane IMA5.

According to the foregoing, wherein: the seventh lens is a biconvex lens, wherein the image side surface S515 is a convex surface; both of the object side surface S516 and image side surface S517 of the optical filter OF5 are plane surfaces; and both of the object side surface S518 and image side surface S519 of the cover glass CG5 are plane surfaces.

With the above design of the lenses, stop ST5 and at least one of the conditions (1), (8)-(10) satisfied, the lens assembly 5 can have an effective shortened total lens length, an effective decreased F-number, an effective increased resolution, an effective resisted environmental temperature change, an effective corrected aberration, and an effective corrected chromatic aberration.

Table 9 shows the optical specification of the lens assembly 5 in FIG. 9.

TABLE 9

Effective Focal Length = 2.990 mm  F-number = 1.33
Total Lens Length = 16.959 mm  Field of View = 147.596 degrees

| Surface Number | Radius of Curvature (mm) | Thickness (mm) | Nd | Vd | Effective Focal Length (mm) | Remark |
|---|---|---|---|---|---|---|
| S51 | 26.656 | 0.400 | 1.69 | 53.3 | −4.868 | L51 |
| S52 | 2.937 | 2.720 | | | | |
| S53 | −3.650 | 1.004 | 1.63 | 23.3 | −21.824 | L52 |
| S54 | −5.542 | 0.054 | | | | |
| S55 | 10.380 | 1.169 | 2 | 29.1 | 9.547 | L53 |
| S56 | −85.199 | 0.200 | | | | |
| S57 | ∞ | 0.168 | | | | ST5 |
| S58 | −19.231 | 0.977 | 1.62 | 63.4 | 16.796 | L54 |
| S59 | −6.812 | 0.102 | | | | |
| S510 | 6.005 | 1.727 | 1.63 | 23.3 | 24.878 | L55 |
| S511 | 8.818 | 2.028 | | | | |
| S512 | −10.467 | 0.907 | 1.63 | 23.3 | 28.056 | L56 |
| S513 | −6.724 | 0.089 | | | | |
| S514 | 8.314 | 2.016 | 1.88 | 40.9 | 9.145 | L57 |
| S515 | −147.997 | 1.989 | | | | |
| S516 | ∞ | 0.300 | 1.52 | 64.2 | | OF5 |
| S517 | ∞ | 0.500 | | | | |

TABLE 9-continued

Effective Focal Length = 2.990 mm F-number = 1.33
Total Lens Length = 16.959 mm Field of View = 147.596 degrees

| Surface Number | Radius of Curvature (mm) | Thickness (mm) | Nd | Vd | Effective Focal Length (mm) | Remark |
|---|---|---|---|---|---|---|
| S518 | ∞ | 0.500 | 1.52 | 64.2 | | CG5 |
| S519 | ∞ | 0.110 | | | | |

The aspheric surface sag z of each aspheric lens in table 9 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C, and D are aspheric coefficients.

In the fifth embodiment, the conic constant k and the aspheric coefficients A, B, C, D of each aspheric lens are shown in Table 10.

TABLE 10

| Surface Number | k | A | B | C | D |
|---|---|---|---|---|---|
| S53 | 0 | 3.522E−03 | 0.000E+00 | 0.000E+00 | 0.000E+00 |
| S54 | 0 | 2.534E−03 | −2.080E−05 | 0.000E+00 | 0.000E+00 |
| S510 | 0 | 1.248E−03 | 0.000E+00 | 0.000E+00 | 0.000E+00 |
| S511 | 0 | 2.346E−03 | 1.165E−04 | 0.000E+00 | 0.000E+00 |
| S512 | 0 | −2.875E−03 | 8.058E−09 | 0.000E+00 | 0.000E+00 |
| S513 | 0 | −5.484E−04 | −5.802E−05 | 7.367E−06 | 0.000E+00 |

Table 11 shows the parameters and condition values for conditions (1), (8)-(10) in accordance with the fifth embodiment of the invention. It can be seen from Table 11 that the lens assembly 5 of the fifth embodiment satisfies the conditions (1), (8)-(10).

TABLE 11

| | | | | | |
|---|---|---|---|---|---|
| IH | 3.200 mm | Gap23 | 0.054 mm | Gap67 | 0.089 mm |
| $f_3/f_7$ | 1.04 | f/IH | 0.93 | Gap23/Gap67 | 0.61 |
| $R_{42}/R_{51}$ | −1.13 | | | | |

Figure 10A:
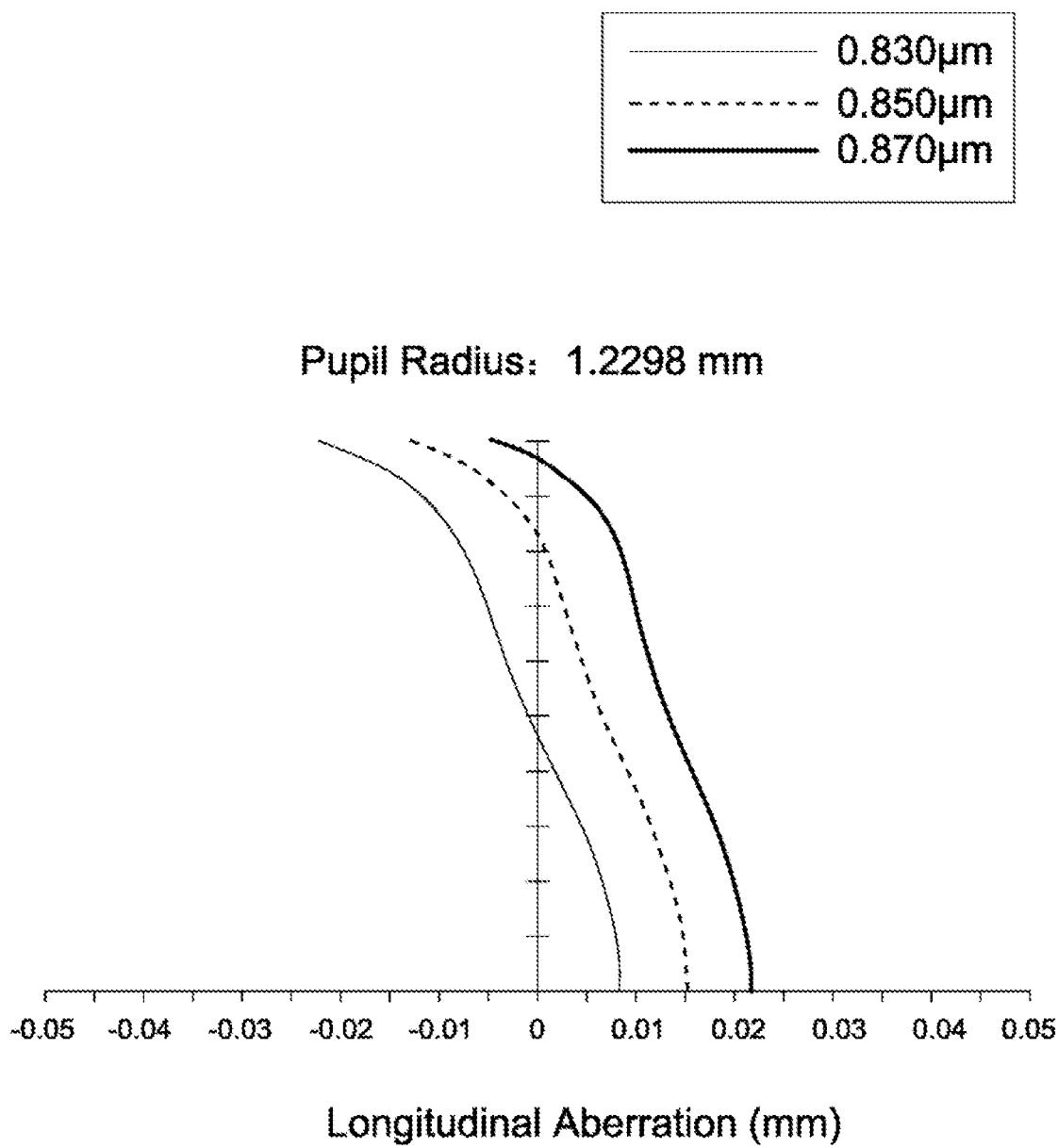
FIG. 10A, FIG. 10B, and FIG. 10C depict a longitudinal aberration diagram, a field curvature diagram, and a distortion diagram of the lens assembly in accordance with the fifth embodiment of the invention, respectively.
Figure 10B:
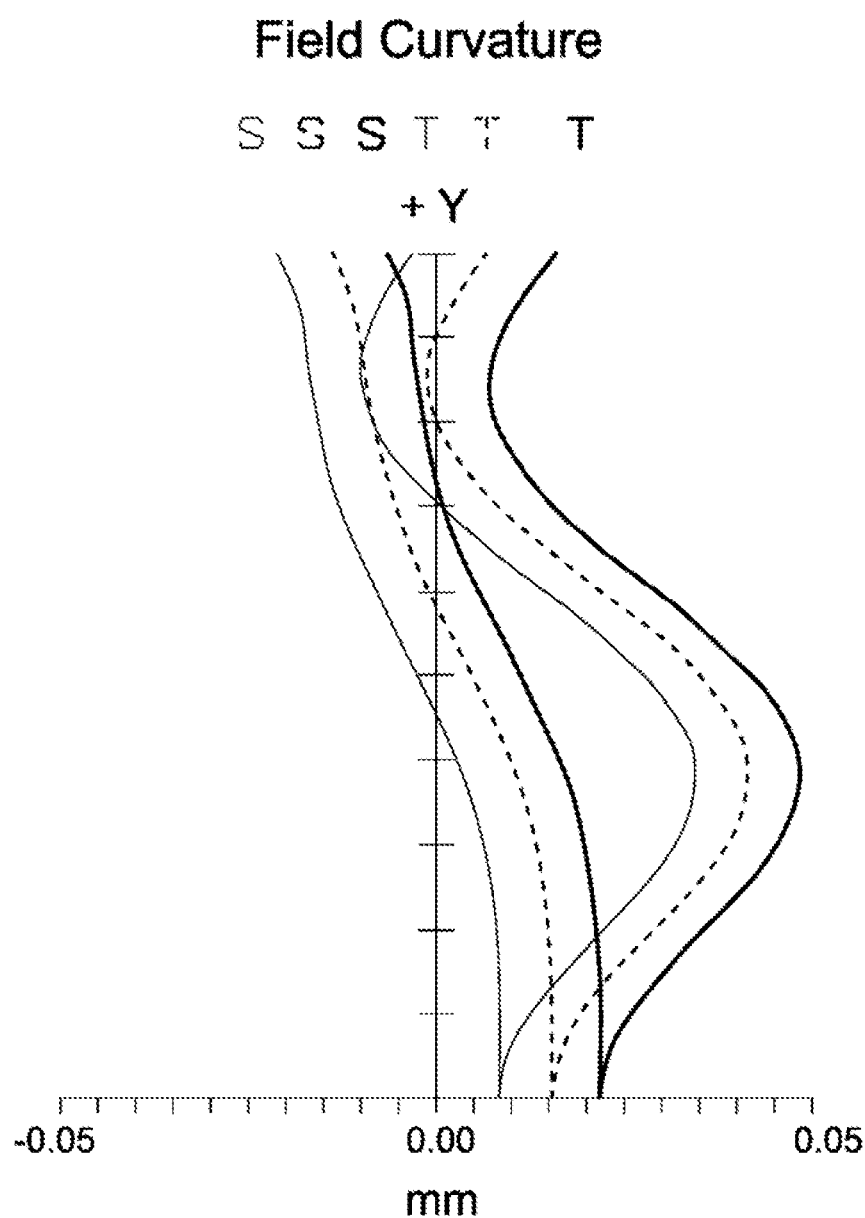
Figure 10C:
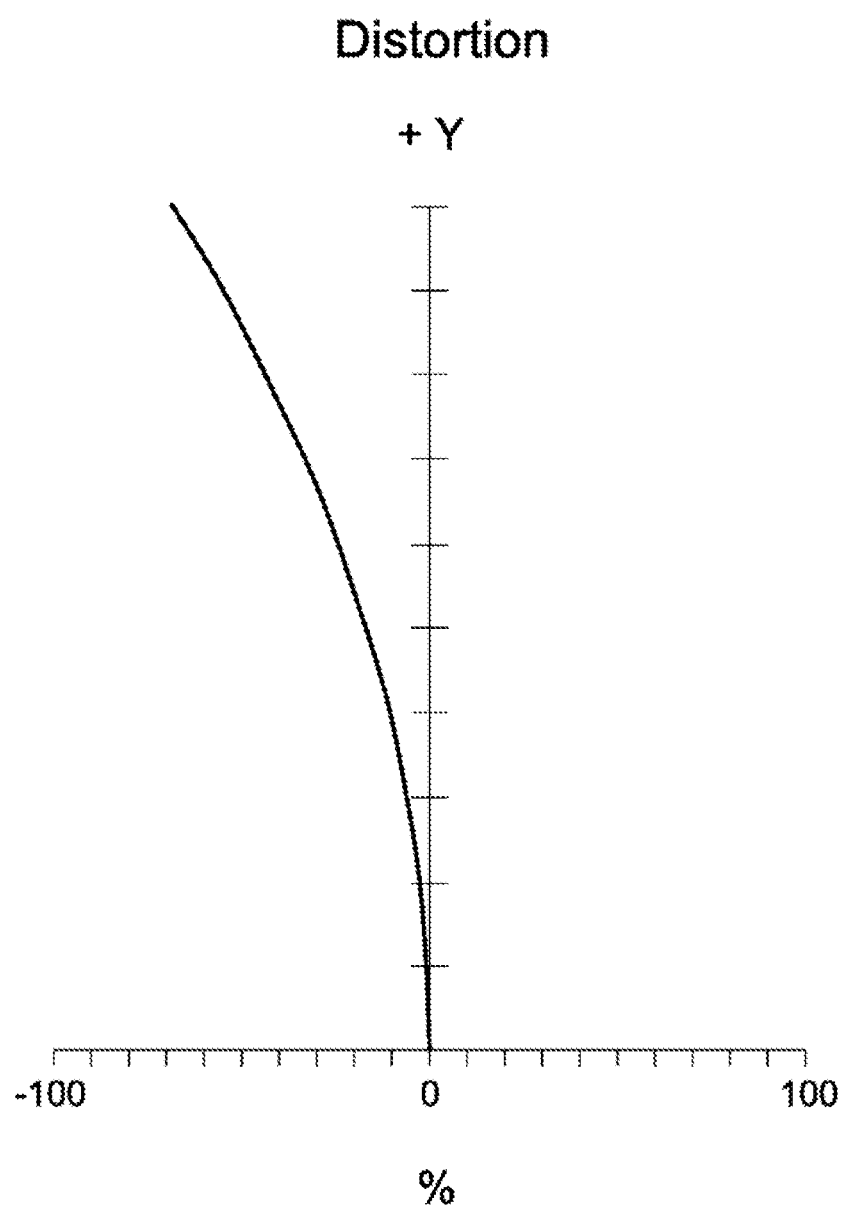

In addition, the lens assembly 5 of the fifth embodiment can meet the requirements of optical performance as seen in FIGS. 10A-10C. It can be seen from FIG. 10A that the longitudinal aberration in the lens assembly 5 of the fifth embodiment ranges from −0.025 mm to 0.025 mm. It can be seen from FIG. 10B that the field curvature of tangential direction and sagittal direction in the lens assembly 5 of the fifth embodiment ranges from −0.025 mm to 0.05 mm. It can be seen from FIG. 10C that the distortion in the lens assembly 5 of the fifth embodiment ranges from −70% to 4%. It is obvious that the longitudinal aberration, the field curvature, and the distortion of the lens assembly 5 of the fifth embodiment can be corrected effectively. Therefore, the lens assembly 5 of the fifth embodiment is capable of good optical performance.

Referring to FIG. 11, the lens assembly 6 includes a first lens L61, a second lens L62, a third lens L63, a stop ST6, a fourth lens L64, a fifth lens L65, a sixth lens L66, a seventh lens L67, an optical filter OF6, and a cover glass CG6, all of which are arranged in order from an object side to an image side along an optical axis OA6. In operation, the light from the object side is imaged on an image plane IMA6.

According to the foregoing, wherein: the seventh lens is a meniscus lens, wherein the image side surface S615 is a concave surface; both of the object side surface S616 and image side surface S617 of the optical filter OF6 are plane surfaces; and both of the object side surface S618 and image side surface S619 of the cover glass CG6 are plane surfaces.

With the above design of the lenses, stop ST6, and at least one of the conditions (1), (8)-(10) satisfied, the lens assembly 6 can have an effective shortened total lens length, an effective decreased F-number, an effective increased resolution, an effective resisted environmental temperature change, an effective corrected aberration, and an effective corrected chromatic aberration.

Table 12 shows the optical specification of the lens assembly 6 in FIG. 11.

TABLE 12

Effective Focal Length = 2.870 mm F-number = 1.32
Total Lens Length = 16.954 mm Field of View = 147.2 degrees

| Surface Number | Radius of Curvature (mm) | Thickness (mm) | Nd | Vd | Effective Focal Length (mm) | Remark |
|---|---|---|---|---|---|---|
| S61 | 17.091 | 0.400 | 1.77 | 49.6 | −4.711 | L61 |
| S62 | 2.927 | 2.769 | | | | |
| S63 | −3.606 | 1.073 | 1.63 | 23.3 | −17.568 | L62 |
| S64 | −6.045 | 0.057 | | | | |
| S65 | 10.596 | 1.257 | 1.95 | 32.3 | 7.662 | L63 |
| S66 | −20.328 | −0.059 | | | | |
| S67 | ∞ | 0.271 | | | | ST6 |
| S68 | −11.524 | 0.870 | 1.55 | 63.5 | 29.156 | L64 |
| S69 | −6.848 | 0.108 | | | | |
| S610 | 6.142 | 1.851 | 1.63 | 23.3 | 21.865 | L65 |
| S611 | 10.076 | 1.875 | | | | |
| S612 | −10.358 | 1.094 | 1.63 | 23.3 | 19.994 | L66 |
| S613 | −5.828 | 0.091 | | | | |
| S614 | 8.443 | 1.831 | 1.88 | 40.8 | 10.408 | L67 |
| S615 | 127.039 | 2.056 | | | | |
| S616 | ∞ | 0.300 | 1.52 | 64.2 | | OF6 |
| S617 | ∞ | 0.500 | | | | |
| S618 | ∞ | 0.500 | 1.52 | 64.2 | | CG6 |
| S619 | ∞ | 0.110 | | | | |

The definition of aspheric surface sag z of each aspheric lens in table 12 is the same as that of in Table 9, and is not described here again.

In the sixth embodiment, the conic constant k and the aspheric coefficients A, B, C, D of each aspheric lens are shown in Table 13.

TABLE 13

| Surface Number | k | A | B | C | D |
|---|---|---|---|---|---|
| S63 | 0 | 0.00E+00 | 3.52E−03 | 0.00E+00 | 0.00E+00 |
| S64 | 0 | 0.00E+00 | 2.34E−03 | −3.14E−05 | 0.00E+00 |
| S610 | 0 | 0.00E+00 | 1.33E−03 | 0.00E+00 | 0.00E+00 |
| S611 | 0 | 0.00E+00 | 2.82E−03 | 1.47E−04 | 0.00E+00 |
| S612 | 0 | 0.00E+00 | −3.43E−03 | 0.00E+00 | 0.00E+00 |
| S613 | 0 | 0.00E+00 | −7.51E−04 | −7.94E−05 | 7.11E−06 |

Table 14 shows the parameters and condition values for conditions (1), (8)-(10) in accordance with the sixth embodiment of the invention. It can be seen from Table 14 that the lens assembly 6 of the sixth embodiment satisfies the conditions (1), (8)-(10).

TABLE 14

| IH | 3.200 mm | Gap23 | 0.057 mm | Gap67 | 0.091 mm |
|---|---|---|---|---|---|
| $f_3/f_7$ | 0.74 | f/IH | 0.90 | Gap23/Gap67 | 0.63 |
| $R_{42}/R_{51}$ | −1.12 | | | | |

Figure 12A:
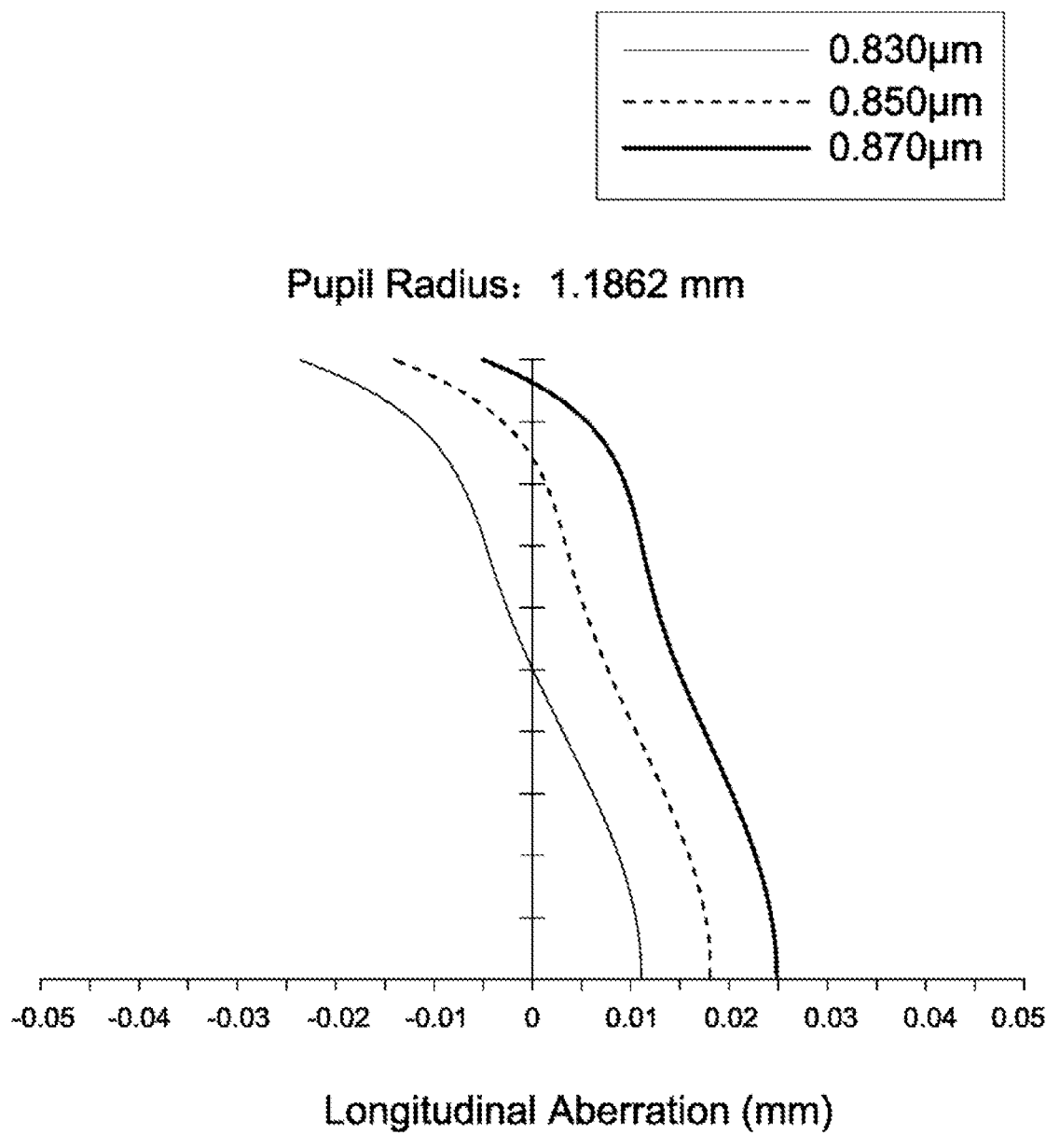
FIG. 12A, FIG. 12B, and FIG. 12C depict a longitudinal aberration diagram, a field curvature diagram, and a distortion diagram of the lens assembly in accordance with the sixth embodiment of the invention, respectively.
Figure 12B:
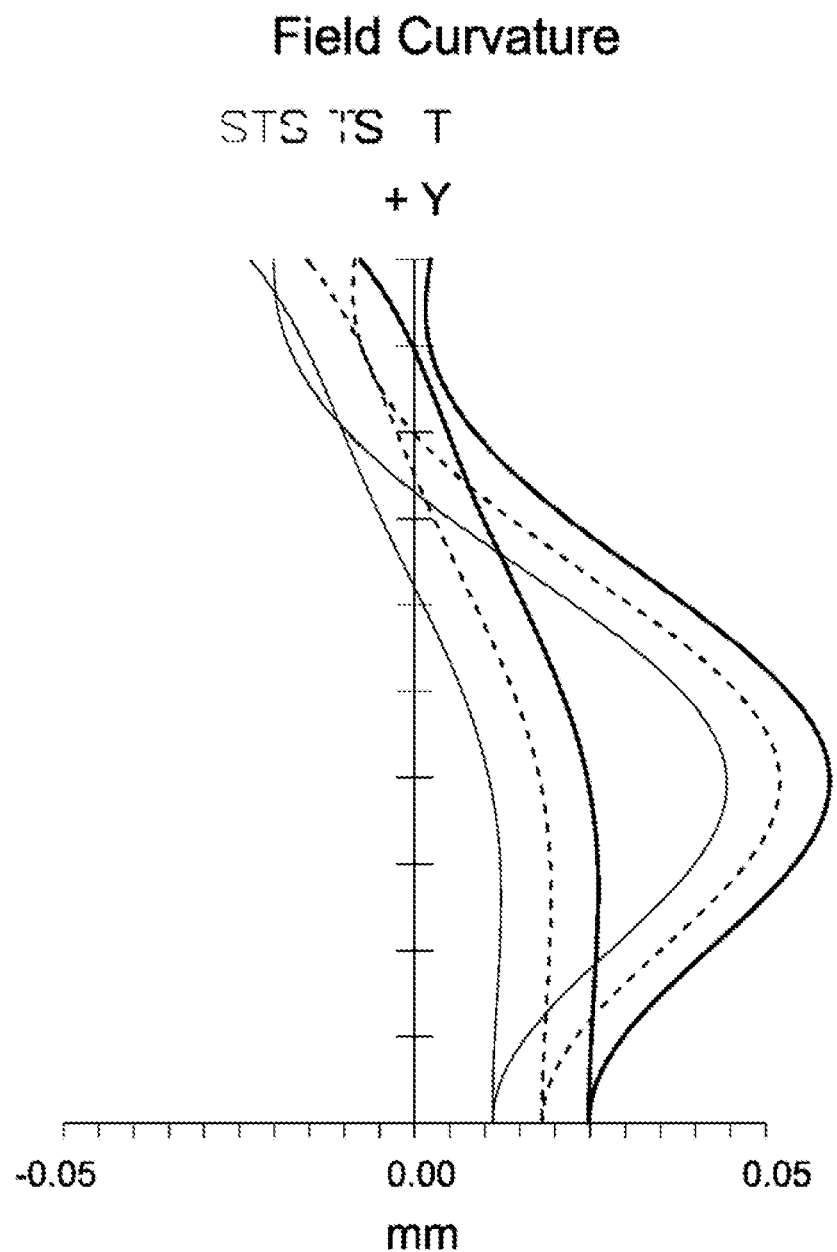
Figure 12C:
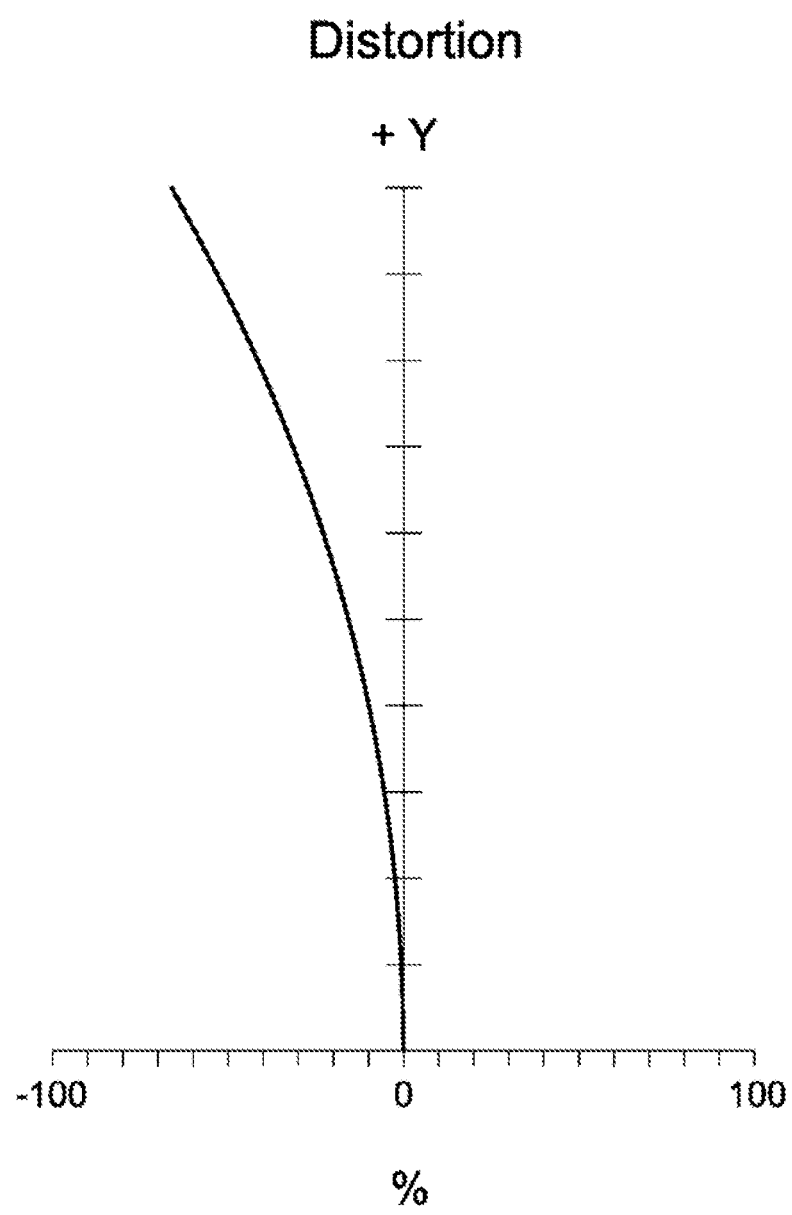

In addition, the lens assembly 6 of the sixth embodiment can meet the requirements of optical performance as seen in FIGS. 12A-12C. It can be seen from FIG. 12A that the longitudinal aberration in the lens assembly 6 of the sixth embodiment ranges from −0.025 mm to 0.025 mm. It can be seen from FIG. 12B that the field curvature of tangential direction and sagittal direction in the lens assembly 6 of the sixth embodiment ranges from −0.03 mm to 0.06 mm. It can be seen from FIG. 12C that the distortion in the lens assembly 6 of the sixth embodiment ranges from −70% to 0%. It is obvious that the longitudinal aberration, the field curvature, and the distortion of the lens assembly 6 of the sixth embodiment can be corrected effectively. Therefore, the lens assembly 6 of the sixth embodiment is capable of good optical performance.

Referring to FIG. 13, the lens assembly 7 includes a first lens L71, a second lens L72, a third lens L73, a stop ST7, a fourth lens L74, a fifth lens L75, a sixth lens L76, a seventh lens L77, an optical filter OF7, and a cover glass CG7 all of which are arranged in order from an object side to an image side along an optical axis OA7. In operation, the light from the object side is imaged on an image plane IMA7.

According to the foregoing, wherein: the seventh lens L77 is a biconvex lens, wherein the image side surface S715 is a convex surface; both of the object side surface S716 and image side surface S717 of the optical filter OF7 are plane surfaces; and both of the object side surface S718 and image side surface S719 of the cover glass CG7 are plane surfaces.

With the above design of the lenses, stop ST7, and at least one of the conditions (1), (8)-(10) satisfied, the lens assembly 7 can have an effective shortened total lens length, an effective decreased F-number, an effective increased resolution, an effective resisted environmental temperature change, an effective corrected aberration, and an effective corrected chromatic aberration.

Table 15 shows the optical specification of the lens assembly 7 in FIG. 13.

TABLE 15

Effective Focal Length = 2.888 mm F-number = 1.32
Total Lens Length = 16.952 mm Field of View = 147.2 degrees

| Surface Number | Radius of Curvature (mm) | Thickness (mm) | Nd | Vd | Effective Focal Length (mm) | Remark |
|---|---|---|---|---|---|---|
| S71 | 18.903 | 0.400 | 1.77 | 49.5 | −4.659 | L71 |
| S72 | 2.946 | 2.772 | | | | |
| S73 | −4.335 | 0.665 | 1.63 | 23.3 | −8.406 | L72 |
| S74 | −29.510 | 0.051 | | | | |
| S75 | 10.596 | 2.069 | 2 | 29.1 | 5.448 | L73 |
| S76 | −9.538 | −0.281 | | | | |
| S77 | ∞ | 0.388 | | | | ST7 |
| S78 | −7.947 | 0.596 | 1.52 | 64.1 | 1885.534 | L74 |
| S79 | −8.081 | 0.106 | | | | |
| S710 | 4.355 | 1.686 | 1.63 | 23.3 | 11.756 | L75 |
| S711 | 9.449 | 2.135 | | | | |
| S712 | −18.168 | 0.656 | 1.63 | 23.3 | 82.334 | L76 |
| S713 | −13.527 | 0.101 | | | | |
| S714 | 10.246 | 2.142 | 1.88 | 41 | 7.558 | L77 |
| S715 | −16.087 | 2.056 | | | | |
| S716 | ∞ | 0.300 | 1.52 | 64.2 | | OF7 |
| S717 | ∞ | 0.500 | | | | |
| S718 | ∞ | 0.500 | 1.52 | 64.2 | | CG7 |
| S719 | ∞ | 0.110 | | | | |

The definition of aspheric surface sag z of each aspheric lens in table 15 is the same as that of in Table 9, and is not described here again.

In the seventh embodiment, the conic constant k and the aspheric coefficients A, B, C. D of each aspheric lens are shown in Table 16.

TABLE 16

| Surface Number | k | A | B | C | D |
|---|---|---|---|---|---|
| S73 | 0 | 0.00 | −3.706E−04 | 0.000E+00 | 0.000E+00 |
| S74 | 0 | 0.00 | −1.776E−03 | 9.982E−05 | 0.000E+00 |
| S710 | 0 | 0.00 | −9.299E−05 | 0.000E+00 | 0.000E+00 |
| S711 | 0 | 0.00 | 3.521E−03 | 3.645E−05 | 0.000E+00 |
| S712 | 0 | 0.00 | −2.611E−03 | 0.000E+00 | 0.000E+00 |
| S713 | 0 | 0.00 | 3.087E−04 | −4.187E−05 | 1.330E−05 |

Table 17 shows the parameters and condition values for conditions (1), (8)-(10) in accordance with the seventh embodiment of the invention. It can be seen from Table 17 that the lens assembly 7 of the seventh embodiment satisfies the conditions (1), (8)-(10).

TABLE 17

| IH | 3.200 mm | Gap23 | 0.051 mm | Gap67 | 0.101 mm |
|---|---|---|---|---|---|
| $f_3/f_7$ | 0.73 | f/IH | 0.90 | Gap23/Gap67 | 0.51 |
| $R_{42}/R_{51}$ | −1.86 | | | | |

Figure 14A:
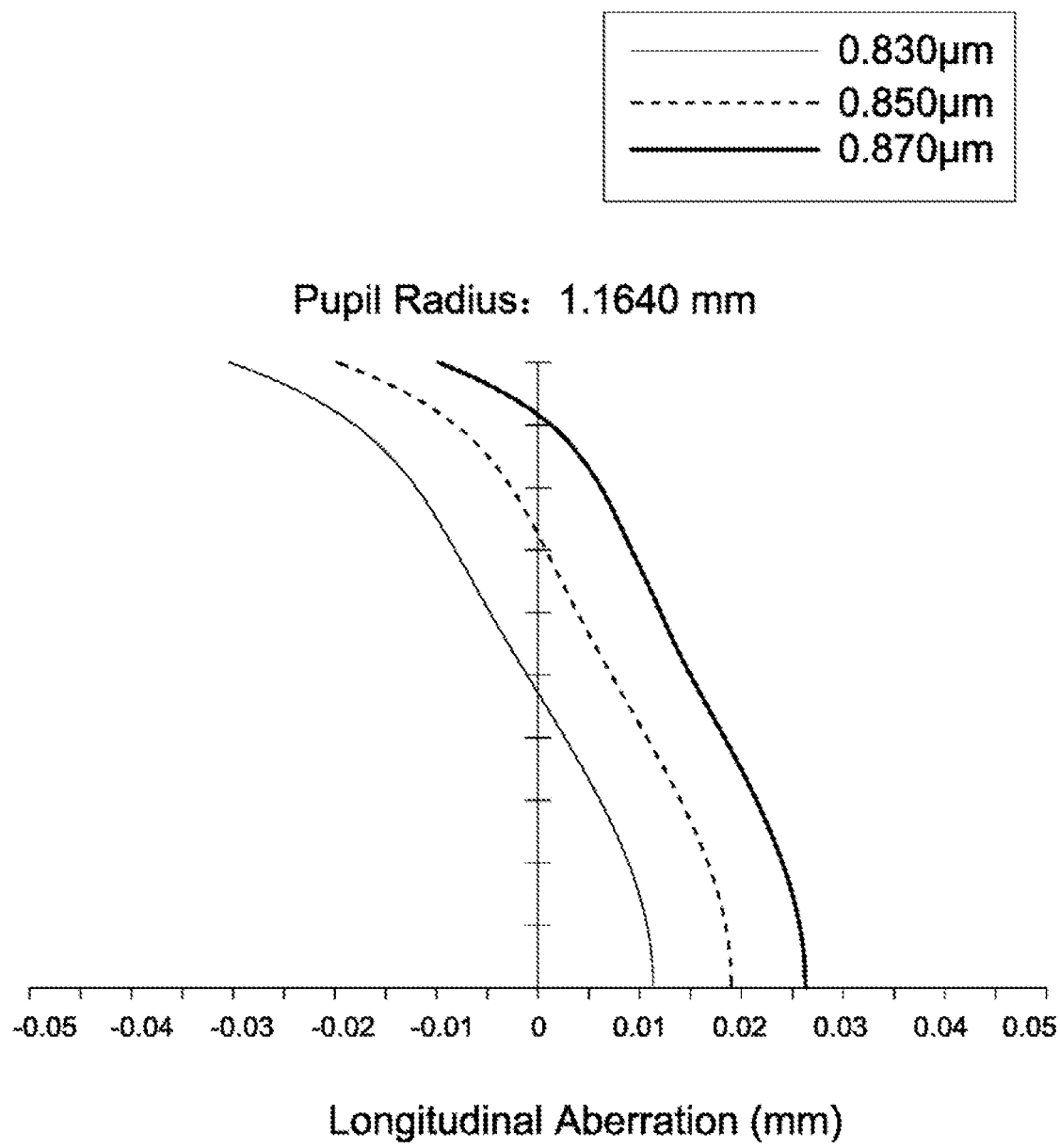
FIG. 14A, FIG. 14B, and FIG. 14C depict a longitudinal aberration diagram, a field curvature diagram, and a distortion diagram of the lens assembly in accordance with the seventh embodiment of the invention, respectively.
Figure 14B:
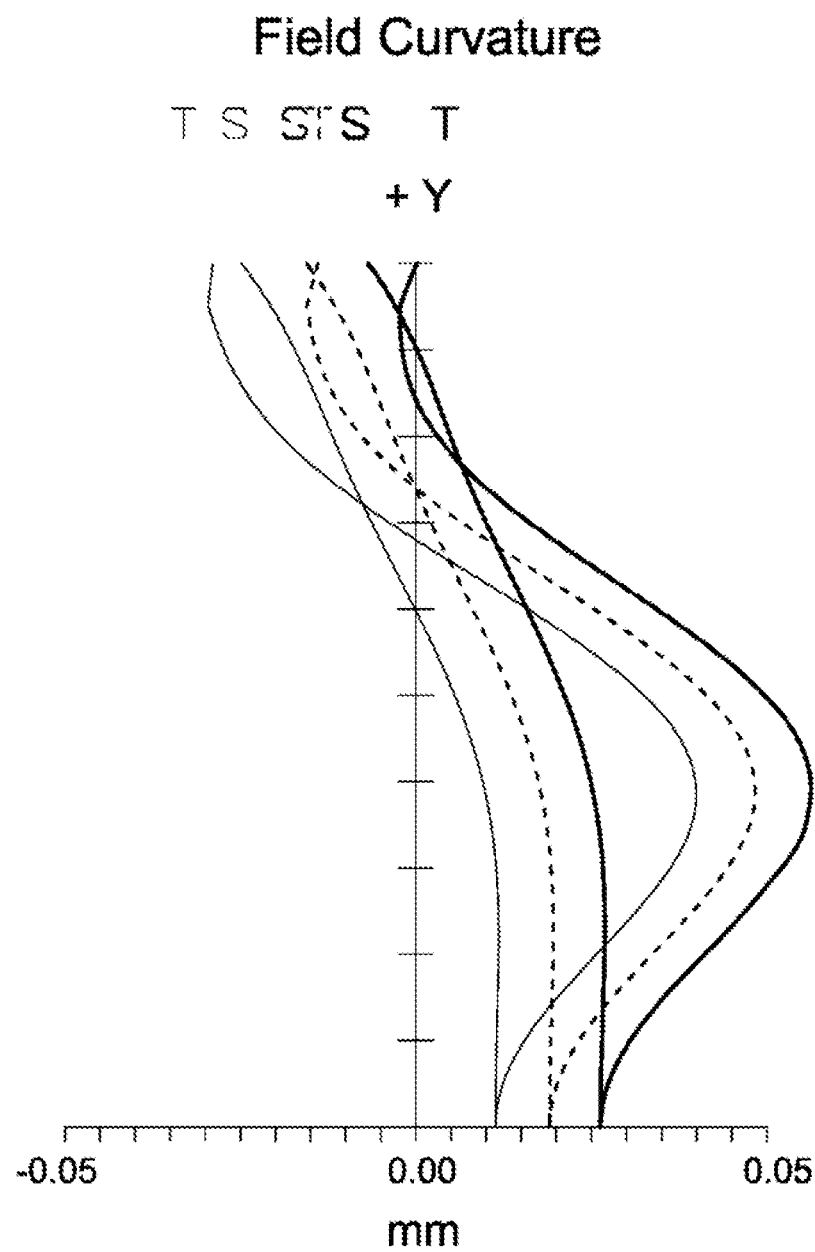
Figure 14C:
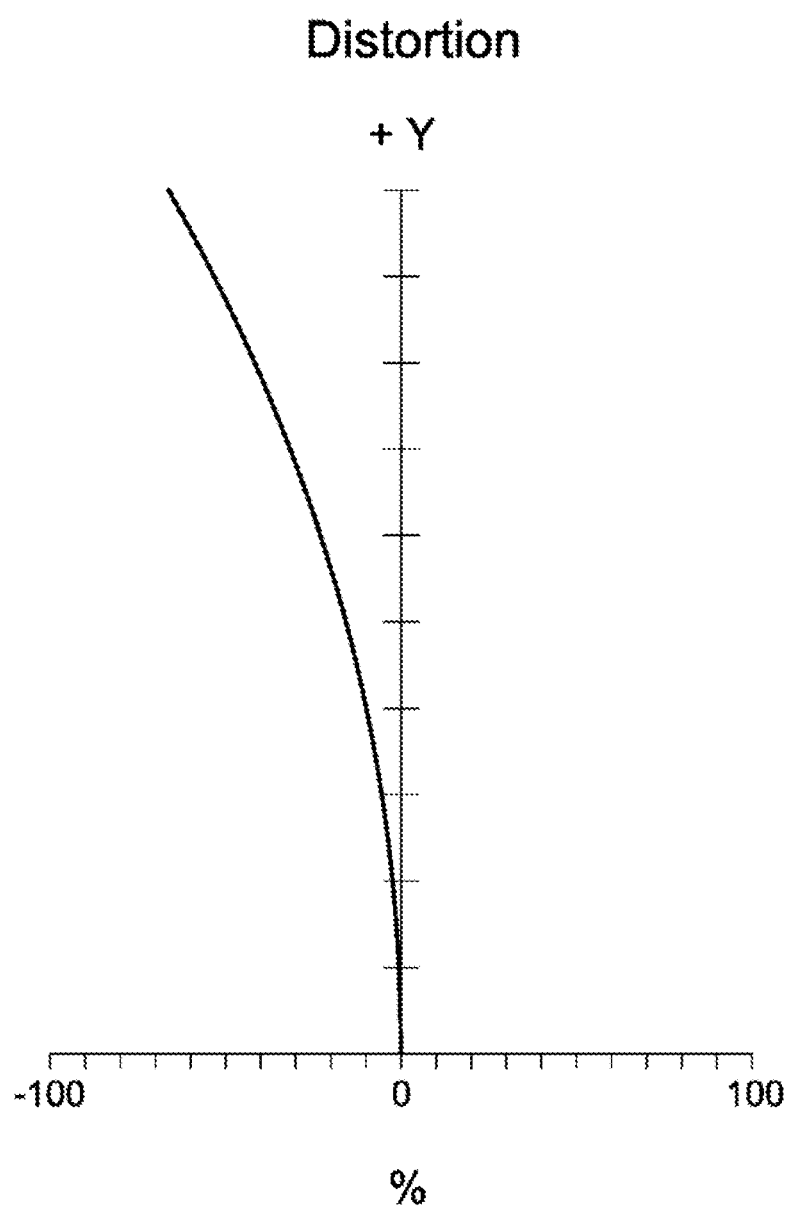

In addition, the lens assembly 7 of the seventh embodiment can meet the requirements of optical performance as seen in FIGS. 14A-14C. It can be seen from FIG. 14A that the longitudinal aberration in the lens assembly 7 of the seventh embodiment ranges from −0.03 mm to 0.03 mm. It can be seen from FIG. 14B that the field curvature of tangential direction and sagittal direction in the lens assembly 7 of the seventh embodiment ranges from −0.03 mm to 0.06 mm. It can be seen from FIG. 14C that the distortion in the lens assembly 7 of the seventh embodiment ranges from −70% to 0%. It is obvious that the longitudinal aberration, the field curvature, and the distortion of the lens assembly 7 of the seventh embodiment can be corrected effectively.

Therefore, the lens assembly 7 of the seventh embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens which is with negative refractive power;
a second lens which is with refractive power;
a third lens which is with refractive power;
a fourth lens which is with positive refractive power and comprises a convex surface facing an image side;
a fifth lens which is with refractive power;
a sixth lens which is with refractive power and comprises a concave surface facing an object side; and
a seventh lens which is with positive refractive power;
wherein the first lens, the second lens, the third lens, the fourth lens, the fifth lens, the sixth lens, and the seventh lens are arranged in order from the object side to the image side along an optical axis;
wherein an air gap is disposed between the sixth lens and the seventh lens;
wherein the lens assembly satisfies at least one of following conditions:

$0.7 < f/IH < 1.5;$ $0.5 < Gap23/Gap67 < 0.75;$ wherein f is an effective focal length of the lens assembly, IH is a half image height of the lens assembly, Gap23 is an interval from an image side surface of the second lens to an object side surface of the third lens along the optical axis, and Gap67 is an interval from an image side surface of the sixth lens to an object side surface of the seventh lens along the optical axis;
wherein the lens assembly satisfies at least one of following conditions:

$-4 < f_2/f_6 < 7;$ $0.7 < f_3/f_7 < 1.1;$ $-3 < f_{123}/f_{4567} < 2;$ wherein $f_2$ is an effective focal length of the second lens, $f_3$ is an effective focal length of the third lens, $f_6$ is an effective focal length of the sixth lens, $f_7$ is an effective focal length of the seventh lens, $f_{123}$ is an effective focal length of a combination of the first lens, the second lens, and the third lens, and $f_{4567}$ is an effective focal length of a combination of the fourth lens, the fifth lens, the sixth lens, and the seventh lens.

2. The lens assembly as claimed in claim 1, wherein:
the second lens is with negative refractive power; and
the third lens is with positive refractive power.

3. The lens assembly as claimed in claim 2, wherein:
the third lens comprises a convex surface facing the object side;
the fourth lens further comprises a concave surface facing the object side;
the sixth lens further comprises a convex surface facing the image side; and
the seventh lens comprises a concave surface facing the image side.

4. The lens assembly as claimed in claim 3, wherein the fifth lens is a biconcave lens with negative refractive power and comprises a concave surface facing the object side and another concave surface facing the image side.

5. The lens assembly as claimed in claim 3, wherein the lens assembly satisfies at least one of following conditions:

$-15 < (R_{21}-R_{22})/(R_{21}+R_{22}) < 0.8;$ $-6 < R_{61}/R_{31} < 30;$ $-2 < R_{42}/R_{51} < -0.8;$ $0.2 < Vd_5/Vd_6 < 3;$ $3 < TTL/BFL < 5;$ wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, and BFL is an interval from an image side surface of the seventh lens to the image plane along the optical axis.

6. The lens assembly as claimed in claim 2, wherein:
the fifth lens is with positive refractive power; and
the sixth lens is with negative refractive power.

7. The lens assembly as claimed in claim 6, wherein the third lens comprises a convex surface facing the object side.

8. The lens assembly as claimed in claim 7, wherein the lens assembly satisfies at least one of following conditions:

$-15 < (R_{21}-R_{22})/(R_{21}+R_{22}) < 0.8;$ $-6 < R_{61}/R_{31} < 30;$ $-2 < R_{42}/R_{51} < -0.8;$ $0.2 < Vd_5/Vd_6 < 3;$ $3 < TTL/BFL < 5;$ wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, and BFL is an interval from an image side surface of the seventh lens to the image plane along the optical axis.

9. The lens assembly as claimed in claim 1, wherein:
the fifth lens is with positive refractive power; and
the sixth lens is with positive refractive power.

10. The lens assembly as claimed in claim 9, wherein:
the third lens comprises a convex surface facing the object side;
the fourth lens further comprises a concave surface facing the object side;

the sixth lens further comprises a convex surface facing the image side; and the seventh lens comprises a concave surface facing the image side.

11. The lens assembly as claimed in claim 10, wherein the lens assembly satisfies at least one of following conditions:

$-15<(R_{21}-R_{22})/(R_{21}+R_{22})<0.8;$ $-6<R_{61}/R_{31}<30;$ $-2<R_{42}/R_{51}<-0.8;$ $0.2<Vd_5/Vd_6<3;$ $3<TTL/BFL<5;$ wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, and BFL is an interval from an image side surface of the seventh lens to the image plane along the optical axis.

12. The lens assembly as claimed in claim 1, wherein:

the third lens comprises a convex surface facing the object side;

the fourth lens further comprises a concave surface facing the object side;

the sixth lens further comprises a convex surface facing the image side; and the seventh lens comprises a concave surface facing the image side.

13. The lens assembly as claimed in claim 12, wherein the fifth lens is a biconcave lens with negative refractive power and comprises a concave surface facing the object side and another concave surface facing the image side.

14. The lens assembly as claimed in claim 1, wherein:

the second lens is with positive refractive power; and the third lens is with negative refractive power.

15. The lens assembly as claimed in claim 14, wherein:

the fifth lens is with positive refractive power; and the sixth lens is with negative refractive power.

16. The lens assembly as claimed in claim 1, wherein the lens assembly satisfies at least one of following conditions:

$-15<(R_{21}-R_{22})/(R_{21}+R_{22})<0.8;$ $-6<R_{61}/R_{31}<30;$ $-2<R_{42}/R_{51}<-0.8;$ $0.2<Vd_5/Vd_6<3;$ $3<TTL/BFL<5;$ wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, and BFL is an interval from an image side surface of the seventh lens to the image plane along the optical axis.

17. A lens assembly comprising:

a first lens which is with negative refractive power;

a second lens which is with refractive power;

a third lens which is with refractive power;

a fourth lens which is with positive refractive power and comprises a convex surface facing an image side;

a fifth lens which is with refractive power;

a sixth lens which is with positive refractive power and comprises a concave surface facing an object side; and a seventh lens which is with positive refractive power;

wherein the first lens, the second lens, the third lens, the fourth lens, the fifth lens, the sixth lens, and the seventh lens are arranged in order from the object side to the image side along an optical axis;

wherein an air gap is disposed between the sixth lens and the seventh lens;

wherein the lens assembly satisfies at least one of following conditions:

$-4<f_2/f_6<7;$ $0.7<f_3/f_7<1.1;$ $-3<f_{123}/f_{4567}<2;$ wherein $f_2$ is an effective focal length of the second lens, $f_3$ is an effective focal length of the third lens, $f_6$ is an effective focal length of the sixth lens, $f_7$ is an effective focal length of the seventh lens, $f_{123}$ is an effective focal length of a combination of the first lens, the second lens, and the third lens, and $f_{4567}$ is an effective focal length of a combination of the fourth lens, the fifth lens, the sixth lens, and the seventh lens.

18. The lens assembly as claimed in claim 17, wherein:

the third lens comprises a convex surface facing the object side;

the fifth lens is a biconcave lens with negative refractive power and comprises a concave surface facing the object side and another concave surface facing the image side; and the sixth lens further comprises a convex surface facing the image side.

19. The lens assembly as claimed in claim 18, wherein the lens assembly satisfies at least one of following conditions:

$0.7<f/IH<1.5;$ $-15<(R_{21}-R_{22})/(R_{21}+R_{22})<0.8;$ $-6<R_{61}/R_{31}<30;$ $-2<R_{42}/R_{51}<-0.8;$ $0.2<Vd_5/Vd_6<3;$ $3<TTL/BFL<5;$ $0.5<Gap23/Gap67<0.75;$ wherein f is an effective focal length of the lens assembly, IH is a half image height of the lens assembly, $R_{21}$ is a radius of curvature of an object side surface of the second lens, $R_{22}$ is a radius of curvature of an image side surface of the second lens, $R_{31}$ is a radius of curvature of an object side surface of the third lens, $R_{42}$ is a radius of curvature of an image side surface of the fourth lens, $R_{51}$ is a radius of curvature of an object side surface of the fifth lens, $R_{61}$ is a radius of curvature of an image side surface of the sixth lens, $Vd_5$ is an Abbe number of the fifth lens, $Vd_6$ is an Abbe number of the sixth lens, TTL is an interval from an object side surface of the first lens to an image plane along the optical axis, BFL is an interval from an image side surface of the seventh lens to the image plane along the optical axis, Gap23 is an interval from an image side surface of the second lens to an object side surface of the third lens along the optical axis, and Gap67 is an interval from an image side surface of the sixth lens to an object side surface of the seventh lens along the optical axis.

20. A lens assembly comprising:
a first lens which is with negative refractive power;
a second lens which is with refractive power;
a third lens which is with refractive power;
a fourth lens which is with positive refractive power and comprises a concave surface facing an object side and a convex surface facing an image side;
a fifth lens which is with refractive power;
a sixth lens which is with refractive power and comprises a concave surface facing the object side; and
a seventh lens which is with positive refractive power and comprises a concave surface facing the image side;
wherein the first lens, the second lens, the third lens, the fourth lens, the fifth lens, the sixth lens, and the seventh lens are arranged in order from the object side to the image side along an optical axis;
wherein an air gap is disposed between the sixth lens and the seventh lens;
wherein the lens assembly satisfies at least one of following conditions:

$-4 < f_2/f_6 < 7;$ $0.7 < f_3/f_7 < 1.1;$ $-3 < f_{123}/f_{4567} < 2;$ wherein $f_2$ is an effective focal length of the second lens, $f_3$ is an effective focal length of the third lens, $f_6$ is an effective focal length of the sixth lens, $f_7$ is an effective focal length of the seventh lens, $f_{123}$ is an effective focal length of a combination of the first lens, the second lens, and the third lens, and $f_{4567}$ is an effective focal length of a combination of the fourth lens, the fifth lens, the sixth lens, and the seventh lens.

* * * * *